US012666324B2

(12) United States Patent
Yavuz et al.

(10) Patent No.:  US 12,666,324 B2
(45) Date of Patent:  Jun. 23, 2026

(54) METHODS TO REDUCE THE TIME TAKEN TO PERFORM CELL SELECTION DURING T311 AFTER RADIO LINK FAILURE IN INTERNET OF THINGS NON-TERRESTRIAL NETWORKS

(71) Applicant: Telefonaktiebolaget LM Ericsson (publ), Stockholm (SE)

(72) Inventors: Emre Yavuz, Stockholm (SE); Johan Rune, Lidingö (SE); Helka-Liina Määttänen, Espoo (FI); Jonas Sedin, Brentford (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 327 days.

(21) Appl. No.: 18/285,245

(22) PCT Filed: Apr. 8, 2022

(86) PCT No.: PCT/IB2022/053330
§ 371 (c)(1),
(2) Date: Sep. 30, 2023

(87) PCT Pub. No.: WO2022/215052
PCT Pub. Date: Oct. 13, 2022

(65) Prior Publication Data
US 2024/0172059 A1      May 23, 2024

Related U.S. Application Data

(60) Provisional application No. 63/173,199, filed on Apr. 9, 2021.

(51) Int. Cl.
*H04W 36/00*          (2009.01)
*H04W 76/27*          (2018.01)

(52) U.S. Cl.
CPC . *H04W 36/0077* (2013.01); *H04W 36/00837* (2018.08); *H04W 76/27* (2018.02)

(58) Field of Classification Search
CPC ....... H04W 36/0077; H04W 36/00837; H04W 48/16; H04W 76/19; H04W 76/27; H04W 84/06; H04B 7/18513; H04B 7/18541
(Continued)

(56) References Cited

U.S. PATENT DOCUMENTS 9,961,607 B2 *  5/2018  Cui ........................ H04W 76/19
10,856,353 B2 *  12/2020  Tarimala ............... H04W 24/10
(Continued)

FOREIGN PATENT DOCUMENTS

CN        103974452 A      8/2014
WO        WO-2017189862 A1 * 11/2017   ......... H04B 7/18541
(Continued)

OTHER PUBLICATIONS

International Search Report and Written Opinion of the International Searching Authority, PCT/IB2022/053330, mailed Jul. 11, 2022, 15 pages.
(Continued)

*Primary Examiner* — David Q Nguyen
(74) *Attorney, Agent, or Firm* — Ericsson Inc.

(57)          ABSTRACT

A method by a wireless device includes obtaining assistance information for identifying at least one cell for performing a cell reestablishment procedure, and taking at least one action based on the assistance information. A method by a network node includes transmitting, to a wireless device, assistance information for identifying at least one cell for performing a cell reestablishment procedure. The method may further include configuring the wireless device to
(Continued)

performing a cell search to identify at least one cell for performing the cell reestablishment procedure based on the assistance information.

18 Claims, 15 Drawing Sheets

(58) Field of Classification Search
USPC ........ 370/328, 329, 330; 455/437, 438, 439, 455/440, 441
See application file for complete search history.

(56) References Cited

U.S. PATENT DOCUMENTS

| | | | | |
|---|---|---|---|---|
| 12,538,375 | B2 * | 1/2026 | Cheng .................. | H04W 76/19 |
| 2011/0105074 | A1 * | 5/2011 | Wu ....................... | H04W 76/19 |
| | | | | 455/404.1 |
| 2014/0078885 | A1 * | 3/2014 | Koskinen .......... | H04W 36/0061 |
| | | | | 370/216 |
| 2016/0014646 | A1 | 1/2016 | Yiu et al. | |
| 2023/0337035 | A1 * | 10/2023 | Cao ....................... | H04W 24/10 |

FOREIGN PATENT DOCUMENTS

| | | | | |
|---|---|---|---|---|
| WO | WO-2018028662 | A1 * | 2/2018 | ............ H04W 74/00 |
| WO | WO-2021147004 | A1 * | 7/2021 | ............. H04W 4/02 |
| WO | 2022038149 | A1 | 2/2022 | |
| WO | 2022038510 | A1 | 2/2022 | |

OTHER PUBLICATIONS

Huawei et al., "Discussion on Mobility and TA for NTN NB-Iot," 3GPP TSG RAN WG2 #113-e, R2-2101054, Electronic, Jan. 25-Feb. 5, 2021, 3 pages.

Huawei et al., "Discussion on feeder link switch for transparent LEO," 3GPP TSG-RAN WG2 Meeting 108, R2-1915190, Reno, USA, Nov. 18-22, 2019, 4 pages.

Xiaomi, "Discussion on connected mode mobility in NB-IoT and eMTC NTN," 3GPP TSG WG2 #113, R2-2100807, e-Meeting, Jan. 25-Feb. 5, 2021, 4 pages.

Xiaomi, "Control Plane for Idle mode UE," 3GPP TSG RAN WG2 #112, R2-2009597, e-Meeting, Nov. 2-13, 2020, 4 pages.

Huawei, "Extension of timer T311," 3GPP TSG-RAN2 Meeting #97, R2-1702088, Athens, Greece, Feb. 13-17, 2017, 3 pages.

Mediatek Inc., "On Cell Re-selection in NR-NTN," 3GPP TSG-RAN WG2 Meeting #112-e, R2-2008897, Online, Nov. 2-13, 2020, 4 pages.

Thales, "Study on solutions evaluation for NR to support Non Terrestrial Network," 3GPP TSG RAN meeting #80, RP-181370, La Jolla, USA, Jun. 11-14, 2018, 5 pages.

3GPP TR 38.821 V16.0.0 (Dec. 2019); 3rd Generation Partnership Project; Technical Specification Group Radio Access Network; Solutions for NR to support non-terrestrial networks (NTN) (Release 16), 140 pages.

3GPP TR 38.811 V15.4.0 (Sep. 2020); 3rd Generation Partnership Project; Technical Specification Group Radio Access Network; Study on New Radio (NR) to support non-terrestrial networks (Release 15), 127 pages.

* cited by examiner

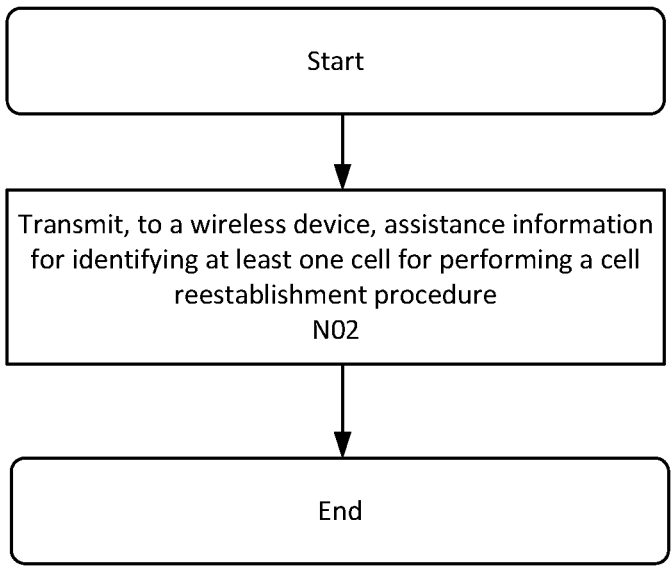

```
┌─────────────────────────────────────────┐
│                  Start                   │
└─────────────────────────────────────────┘
                    │
                    ▼
┌─────────────────────────────────────────┐
│ Transmit, to a wireless device, assistance information │
│ for identifying at least one cell for performing a cell │
│         reestablishment procedure        │
│                   N02                    │
└─────────────────────────────────────────┘
                    │
                    ▼
┌─────────────────────────────────────────┐
│                   End                    │
└─────────────────────────────────────────┘
```

FIGURE 18

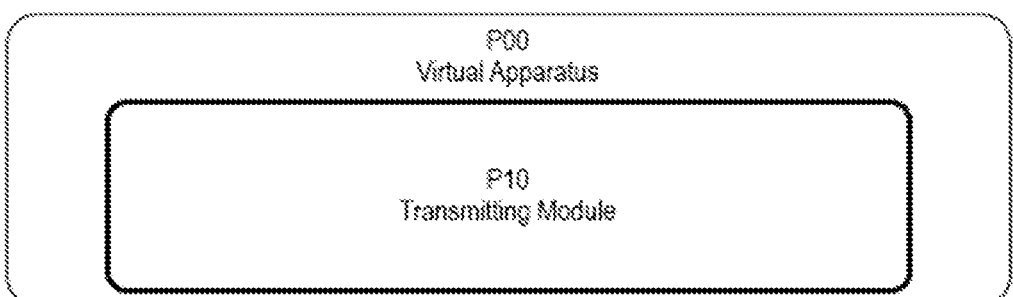

P00
Virtual Apparatus

P10
Transmitting Module

FIGURE 19

METHODS TO REDUCE THE TIME TAKEN TO PERFORM CELL SELECTION DURING T311 AFTER RADIO LINK FAILURE IN INTERNET OF THINGS NON-TERRESTRIAL NETWORKS

CROSS REFERENCE TO RELATED APPLICATIONS

This application is a 35 U.S.C. § 371 national stage application of PCT International Application No. PCT/IB2022/053330 filed on Apr. 8, 2022, which in turn claims the benefit of and priority to U.S. Provisional Application No. 63/173,199 filed on Apr. 9, 2021, entitled "METHODS TO REDUCE THE TIME TAKEN TO PERFORM CELL SELECTION DURING T311 AFTER RADIO LINK FAILURE IN INTERNET OF THINGS NON-TERRESTRIAL NETWORKS," the disclosures and content of which are incorporated by reference herein in their entirety.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been much discussion in 3rd Generation Partnership Project (3GPP) in the last few years on how to specify technologies to cover/address use cases for Machine-to-Machine (M2M) and/or Internet of Things (IoT). In Release 13 enhancements to support Machine-Type Communications (MTC) were specified introducing new User Equipment (UE) categories M1 (Cat-M1) and NB1 (Cat-NB1) to support reduced maximum bandwidth of up to 6 physical resource blocks (PRBs) in Enhanced MTC (eMTC) work item and narrowband carrier in Narrowband-Internet of Things (NB-IoT) work item specifying a new radio interface, respectively.

There are multiple differences between "legacy" Long Term Evolution (LTE) and the procedures and channels defined for eMTC or NB-IoT. Some important differences include a new physical downlink control channel, i.e., the MTC Physical Downlink Control Channel (MPDCCH) used in eMTC and Narrowband Physical Downlink Control Channel (NPDCCH) used in NB-IoT.

eMTC

3GPP Release 12 initiated the work on eMTC, also often referred to as LTE-M, and specified the first low-complexity UE category 0 (Cat-0). Cat-0 supports a reduced peak data rate of 1 Mbps, single antenna and half duplex frequency division duplex (HD FDD) operation.

In Release 13, the work accelerated with the introduction of the Cat-M1 UE category. It supports a further reduced complexity, and coverage enhanced (CE) operation. The additional cost reduction came from a reduced transmission and reception bandwidth of 1.08 MHz, equivalent to six 180 kHz physical resource blocks (PRBs). The introduction of a lower UE power class of 20 dBm, in addition to the 23 dBm power class, further facilitates a lower UE complexity.

Because of the reduction in bandwidth, a new narrowband physical downlink control channel, the MTC physical downlink control channel (MPDCCH), was introduced as a substitute for the wideband legacy physical downlink control channel (PDCCH) and the Enhanced PDCCH (EPDCCH). The Cat-M1 UEs monitor MPDCCH in a narrowband (NB), which is defined by 6 adjacent PRBs.

eMTC supports an MCL that is 20 dB larger than the normal MCL of LTE. This is achieved mainly through time repetition and a relaxed acquisition time of the physical channels and signals. The primary and secondary synchronization signals (PSS and SSS) are fully reused from LTE and extended coverage is achieved by means of increased acquisition time.

For the physical broadcast channel (PBCH), the MPDCCH, the physical uplink control channel (PUCCH) and the data channels, that is, the physical uplink shared channel (PUSCH) and physical downlink shared channel (PDSCH), the desired coverage enhancement is achieved through so-called time repetition of a transmission block.

In LTE Releases 14 and 15, eMTC was further enhanced to support a more diversified set of applications and services. A new UE category Cat-M2 was e.g. specified. The performance of eMTC Release 15 meets the IMT-2020 5G requirements for the massive IoT use case.

The work in 3GPP on eMTC was continued in Release 16 and is further evolved also in Release 17.

NB-IoT

At the 3GPP RAN #70 meeting, a new Release 13 work item named Narrowband IoT (NB-IoT) was approved. The objective of the new IoT related work items approved for Release 13 was to specify a radio access for cellular internet of things (IoT) that addresses improved indoor coverage, support for massive number of low throughput devices, not sensitive to delay, ultra-low device cost, low device power consumption and (optimized) network architecture.

NB-IoT can be described as a narrowband version of LTE. Similar to eMTC, NB-IoT makes use of increased acquisition times and time repetitions to extend the system coverage. The repetitions can be seen as a third level of retransmissions added at the physical layer as a complement to those at Medium Access Channel (MAC) Hybrid Automatic Repeat Request (HARQ) and Radio Link Control (RLC) Automatic Repeat Request (ARQ). A NB-IoT downlink carrier is defined by 12 Orthogonal Frequency Domain Multiplexing (OFDM) sub-carriers, each of 15 kHz, giving a total baseband bandwidth of 180 kHz. When multiple carriers are configured, several 180 kHz carriers can be used, e.g., for increasing the system capacity, inter-cell interference coordination, load balancing, etc. This design gives NB-IoT a high deployment flexibility.

NB-IoT supports 3 different deployment scenarios or mode of operations:

1. 'Stand-alone operation' utilizing for example the spectrum currently being used by GERAN systems as a replacement of one or more GSM carriers. In principle it operates on any carrier frequency which is neither within the carrier of another system nor within the guard band of another system's operating carrier. The other system can be another NB-IoT operation or any other RAT e.g. LTE.

2. 'Guard band operation' utilizing the unused resource blocks within an LTE carrier's guard-band. The term guard band may also interchangeably called as guard bandwidth. As an example in case of LTE Bandwidth (BW) of 20 MHz (i.e. Bw1=20 MHz or 100 RBs), the guard band operation of NB-IoT can place anywhere outside the central 18 MHz but within 20 MHz LTE BW.

3. 'In-band operation' utilizing resource blocks within a normal LTE carrier. The in-band operation may also interchangeably be called in-bandwidth operation. More generally the operation of one RAT within the BW of another Radio Access Technology (RAT) is also called as in-band operation. As an example in a LTE BW of 50 Resource Blocks (RBs) (i.e. Bw1=10 MHz or 50 RBs), NB-IoT operation over one resource block (RB) within the 50 RBs is called in-band operation.

Anchor Carrier and Non-Anchor Carrier in NB-IoT

In NB-IoT, anchor and non-anchor carriers are defined. In anchor carrier, the UE assumes that anchor specific signals including NPSS/NSSS/NPBCH/SIB-NB are transmitted on downlink. In non-anchor carrier, the UE does not assume that NPSS/NSSS/NPBCH/SIB-NB are transmitted on downlink. The anchor carrier is transmitted on at least subframes #0, #4, #5 in every frame and subframe #9 in every other frame. Additional DL subframes in a frame can also be configured on anchor carrier by means of a DL bit map. The anchor carriers transmitting NPBCH/SIB-NB contains also NRS. The non-anchor carrier contains NRS during certain occasions and UE specific signals such as NPDCCH and NPDSCH. NRS, NPDCCH and NPDSCH are also transmitted on anchor carrier. The resources for non-anchor carrier are configured by the network node. The non-anchor carrier can be transmitted in any subframe as indicated by a DL bit map. For example the eNB signals a DL bit map of DL subframes using RRC message (DL-Bitmap-NB) which are configured as non-anchor carrier. The anchor carrier and/or non-anchor carrier may typically be operated by the same network node e.g. by the serving cell. But the anchor carrier and/or non-anchor carrier may also be operated by different network nodes.

RLM Procedure in NB-IoT

In this section, the RLM procedure in NB-IoT is described; however, the discussion herein is provided as a reference for the rest of the text and similar aspects apply also to eMTC. The purpose of radio link monitoring (RLM) is to monitor the radio link quality of the serving cell of the UE and use that information to decide whether the UE is in in-sync or out-of-sync with respect to that serving cell. In LTE, RLM is carried out by UE performing measurement on downlink reference symbols (CRS) in RRC_CONNECTED state. If results of RLM points at a certain number of consecutive out of sync (OOS) indications, the UE starts the RLF procedure and declares radio link failure (RLF) after the expiry of RLF timer (e.g. T310). The actual procedure is carried out by comparing the estimated downlink reference symbol measurements to some thresholds, Qout and Qin. Qout and Qin correspond to Block Error Rate (BLER) of hypothetical control channel (e.g. NPDCCH) transmissions from the serving cell. Examples of the target BLER corresponding to Qout and Qin are 10% and 2% respectively. The radio link quality in RLM is performed based on reference signal (e.g. NRS), at least once every radio frame (when not configured with DRX) or periodically with DRX cycle (when configured with DRX), over the system bandwidth or control channel bandwidth (e.g. NPDCCH BW) for the UE, or over the UE bandwidth (e.g., 200 kHz).

T310 is also called as RLF timer which starts when the UE detects physical layer problems for the PCell. More specifically the RLF timer starts upon UE receiving N310 number of consecutive out-of-sync indications from its lower layers. When T310 expires RLF is declared, but T310 is reset upon UE receiving N311 number of consecutive in-sync indications from its lower layers. Upon RLF declaration (i.e. T310 expiration) the UE starts RRC connection re-establishment procedure and starts another timer, which is referred to as the T311 timer or simply T311. The RRC connection re-establishment procedure starts with cell selection and T311 is reset if the UE finds and selects a suitable cell and then the UE sends an RRCReestablishementRequest message in the selected cell and starts timer T301. If the RRC connection reestablishment procedure is successful (indicated by an RRCReestablishment message from the gNB), the UE stops/resets timer T301. If T311 expires before (because the UE failed to select a suitable cell), or if T301 expires (because the RRC connection reestablishment failed), then the UE goes to RRC_IDLE state and it may initiate cell selection. Parameters T310, T311, T301, N310 and N311 are configured by the PCell e.g. via RRC message. T310 can vary from 0 to 8000 ms. T311 can vary from 1000 ms to 30000 ms. N310 can be set from {1, 2, 3, 4, 6, 8, 10, 20}, and N311 can be set from {1, 2, 3, 4, 5, 6, 8, 10}.

FIG. 1 illustrates the RLF and RRC connection re-establishment procedures.

In 3GPP Release 15, the first release of the 5G system (5GS) was specified. This is a new generation's radio access technology intended to serve use cases such as enhanced mobile broadband (eMBB), ultra-reliable and low latency communication (URLLC) and massive machine type communication (mMTC). 5G includes the New Radio (NR) access stratum interface and the 5G Core Network (5GC). The NR physical and higher layers are reusing parts of the LTE specification, and additional components are introduced when motivated by the new use cases.

In Release 15, 3GPP also started the work to prepare NR for operation in a Non-Terrestrial Network (NTN). The work was performed within the study item "NR to support Non-Terrestrial Networks" and resulted in 3GPP TR 38.811. In Release 16, the work to prepare NR for operation in an NTN network continues with the study item "Solutions for NR to support Non-Terrestrial Network". In parallel, the interest to adapt LTE for operation in NTN is growing. As a consequence, 3GPP is considering to introduce support for NTN in both LTE and NR in Release 17.

Satellite Communications

A satellite radio access network usually includes a satellite or space-borne platform, an earth-based gateway that connects the satellite to a base station or a core network, depending on the choice of architecture, a feeder link that refers to the link between a gateway and a satellite, and an access link that refers to the link between a satellite and a UE.

Depending on the orbit altitude, a satellite may be categorized as low earth orbit (LEO), medium earth orbit (MEO), or geostationary earth orbit (GEO) satellite. A LEO satellite orbits at typical heights ranging from 250-1,500 km, with orbital periods ranging from 90-120 minutes. A MEO satellite orbits at typical heights ranging from 5,000-25,000 km, with orbital periods ranging from 3-15 hours. A GEO satellite orbits at a height of at about 35,786 km, with an orbital period of 24 hours.

The significant orbit height means that satellite systems are characterized by a path loss that is significantly higher than what is expected in terrestrial networks. To overcome the pathloss it is often required that the access and feeder links are operated in line of sight conditions, and that the UE is equipped with an antenna offering high beam directivity.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 2 illustrates an example architecture of a satellite network with bent pipe transponders.

The NTN beam may in comparison to the beams observed in a terrestrial network be very wide and cover an area outside of the area defined by the served cell. Beam covering adjacent cells will overlap and cause significant levels of intercell interference. To overcome the large levels of interference a typical approach is a NTN to configure different cells with different carrier frequencies and polarization modes.

In a LEO NTN the satellites are moving with a very high velocity. This leads to a Doppler shift of the carrier frequency on the service link of up to 24 ppm for a LEO satellite at 600 km altitude. The Doppler shift is also time variant due to the satellite motion over the sky. The Doppler shift may vary with up to 0.27 ppm/s for a LEO 600 km satellite. The Doppler shift will impact, i.e. increase or decrease, the frequency received on the service link compared to the transmitted frequency. For GEO NTN the satellites may move in an orbit inclined relative to the plane of the equator. The inclination introduces a periodic movement of the satellite relative earth which introduces a predictable, and daily periodically repeating Doppler shift of the carrier frequency as exemplified in the FIG. 3. Specifically, FIG. 3 illustrates an example of the diurnal Doppler shift of the forward service link observed for a GEO satellite operating from an inclined orbit.

Throughout this disclosure, the terms beam and cell are used interchangeably, unless explicitly noted otherwise. This disclosure is focused on NTN in the context of IoT, but the methods proposed apply to any wireless network dominated by line of sight conditions.

Ephemeris Data

In 3GPP TR 38.821 it has been captured that ephemeris data should be provided to the UE, for example to assist with pointing a directional antenna (or an antenna beam) towards the satellite. A UE knowing its own position, e.g. thanks to GNSS support, may also use the ephemeris data to calculate correct Timing Advance (TA) and Doppler shift. The contents of the ephemeris data and the procedures on how to provide and update such data have not yet been studied in detail.

A satellite orbit can be fully described using 6 parameters. Exactly which set of parameters is used can be decided by the user; many different representations are possible. For example, a choice of parameters used often in astronomy is the set $(a, \varepsilon, i, \Omega, \omega, t)$. Here, the semi-major axis a and the eccentricity c describe the shape and size of the orbit ellipse; the inclination i, the right ascension of the ascending node $\Omega$, and the argument of periapsis determine its position in space, and the epoch t determines a reference time (e.g. the time when the satellites moves through periapsis). The set of these parameters is illustrated in FIG. 4.

A two-line element set (TLE) is a data format encoding a list of orbital elements of an Earth-orbiting object for a given point in time, the epoch. As an example of a different parametrization, TLEs use mean motion n and mean anomaly M instead of a and t.

A completely different set of parameters is the position and velocity vector (x, y, z, vx, vy, vz) of a satellite. These are sometimes called orbital state vectors. They can be derived from the orbital elements and vice versa since the information they contain is equivalent. All these formulations (and many others) are possible choices for the format of ephemeris data to be used in NTN.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another aspect discussed during the study item and captured in TR 38.821, is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit and ranges from weekly to multiple times a day for satellites on very low orbits which are exposed to strong atmospheric drag and need to perform correctional maneuvers often.

So, while it seems possible to provide the satellite position with the required accuracy, care needs to be taken to meet these requirements, e.g. when choosing the ephemeris data format, or the orbital model to be used for the orbital propagation.

Ephemeris data consists of at least 5 parameters describing the shape and position in space of the satellite orbit. It also comes with a timestamp, which is the time when the other parameters describing the orbit ellipse were obtained. The position of the satellite at any given time in the nearer future can be predicted from this data using orbital mechanics. The accuracy of this prediction will however degrade as one projects further and further into the future. The validity time of a certain set of parameters depends on many factors like the type and altitude of the orbit, but also the desired accuracy, and ranges from the scale of a few days to a few years.

SUMMARY

Some embodiments provide a method by a wireless device, including obtaining assistance information for identifying at least one cell for performing a cell reestablishment procedure, and taking at least one action based on the assistance information.

In some embodiments, taking the at least one action includes performing a cell search to identify a particular one of the at least one cell for performing the cell reestablishment procedure, and performing the cell reestablishment procedure for the particular one of the at least one cell.

The method may further include obtaining ephemeris data and determining the at least one cell based on the ephemeris data. In some embodiments, the ephemeris data is obtained from a network node.

In some embodiments, obtaining the assistance information includes receiving the assistance information from a network node. In some embodiments, the assistance information indicates the at least one cell. In some embodiments, the assistance information includes at least one of a carrier frequency, a PCI, ephemeris data of a satellite serving the at least one cell, and a timing of SSB transmissions. In some embodiments, the assistance information indicates that no cell is available, and the method further includes transitioning to an inactive or idle state.

In some embodiments, performing the at least one action includes scaling an amount of time associated with a timer that measures a time associated with a cell search procedure.

In some embodiments, scaling the amount of time associated with the timer includes reducing the amount of time associated with the timer.

In some embodiments, performing the at least one action includes increasing an amount of time associated with a timer that measures a time associated with a cell search procedure.

The method may further include obtaining information indicating a coverage extension level of the wireless device, and wherein the at least one action is taken based on the information indicating the coverage extension level.

In some embodiments, the coverage extension level indicates that the wireless device has a coverage level that is less than a threshold, and wherein taking the at least one action includes increasing an amount of time associated with a timer associated with performing a cell search. In some embodiments, the coverage extension level indicates that the wireless device has a coverage level that is greater than a threshold, and wherein taking the at least one action includes decreasing an amount of time associated with a timer associated with performing a cell search.

The method may further include obtaining information indicating a location of the wireless device, and wherein the at least one action is taken based on the information indicating the location.

In some embodiments, taking the at least one action includes increasing an amount of time associated with a timer associated with performing a cell search based on the location of the wireless device. In some embodiments, taking the at least one action includes decreasing an amount of time associated with a timer associated with performing a cell search based on the location of the wireless device.

The method may further include obtaining information indicating a signal measurement associated with the wireless device, and wherein the at least one action is taken based on the information indicating the signal measurement.

In some embodiments, taking the at least one action includes increasing an amount of time associated with a timer associated with performing a cell search based on the signal measurement. In some embodiments, taking the at least one action includes decreasing an amount of time associated with a timer associated with performing a cell search based on the signal measurement.

The method may further include receiving system information for at least one cell identified during a cell reestablishment procedure.

The wireless device may be a user equipment (UE).

Some embodiments provide a wireless device including processing circuitry configured to perform a method of a wireless device as described above. A computer program including instructions which when executed on a computer perform a method of a wireless device as described above. A computer program product including computer program, the computer program including instructions which when executed on a computer perform a method of a wireless device as described above. A non-transitory computer readable medium storing instructions which when executed by a computer perform a method of a wireless device as described above.

Some embodiments provide a method by a network node, including transmitting, to a wireless device, assistance information for identifying at least one cell for performing a cell reestablishment procedure. The method may further include configuring the wireless device to performing a cell search to identify at least one cell for performing the cell reestablishment procedure based on the assistance information.

In some embodiments, the assistance information includes ephemeris data, and the method further includes configuring the wireless device to determine at least one cell based on the ephemeris data. In some embodiments, the assistance information indicates at least one cell for performing a cell reestablishment procedure. In some embodiments, the assistance information includes at least one of a carrier frequency, a PCI, ephemeris data of a satellite serving the new cell, and a timing of SSB transmissions. In some embodiments, the assistance information indicates that no cell is available, and the method further includes configuring the wireless device to transition to an inactive or idle state when the assistance information indicates that no cell is available.

The method may further include configuring the wireless device to scale an amount of time associated with a timer associated with a cell search procedure based on the assistance information. In some embodiments, configuring the wireless device to scale the amount of time associated with the timer includes configuring the wireless device to reduce the amount of time associated with the timer.

The method may further include configuring the wireless device to increase an amount of time associated with a timer for performing a cell search procedure based on the assistance information.

In some embodiments, the assistance information includes a coverage extension level of the wireless device and/or a threshold associated with a coverage extension level, and the method further includes configuring the wireless device to take at least one action based on the coverage extension level and/or the threshold.

In some embodiments, the at least one action includes increasing an amount of time associated with a timer associated with performing a cell search. In some embodiments, the at least one action includes decreasing an amount of time associated with a timer associated with performing a cell search.

In some embodiments, the assistance information includes a location of the wireless device and/or a threshold or range associated with the location, and wherein the method further includes taking at least one action based on a location of the wireless device and/or the threshold or range associated with the location.

In some embodiments, taking the at least one action includes increasing an amount of time associated with a timer associated with performing a cell search based on the location of the wireless device. In some embodiments, taking the at least one action includes decreasing an amount of time associated with a timer associated with performing a cell search based on the location of the wireless device.

In some embodiments, the assistance information includes a threshold for comparison to a signal measurement associated with the wireless device, and the method further includes configuring the wireless device to take at least one action based on the comparison.

In some embodiments, taking the at least one action includes increasing an amount of time associated with a timer for performing a cell search. In some embodiments, taking the at least one action includes decreasing an amount of time associated with a timer for performing a cell search.

The method may further include transmitting, to the wireless device, system information for at least one cell identified during a cell reestablishment procedure.

The wireless device may be a user equipment (UE), and the network node may be a gNodeB (gNB).

Some embodiments provide a network node including processing circuitry configured to perform a method of a network node as described above. A computer program including instructions which when executed on a computer perform a method of a network node as described above. A computer program product including computer program, the computer program including instructions which when executed on a computer perform a method of a network node as described above. A non-transitory computer readable medium storing instructions which when executed by a computer perform a method of a network node as described above.

BRIEF DESCRIPTION OF THE DRAWINGS

FIG. 18 depicts a method by a network node, according to certain embodiments.

FIG. 19 illustrates a schematic block diagram of a virtual apparatus in a wireless network according to some embodiments.

DETAILED DESCRIPTION

Figure 1:
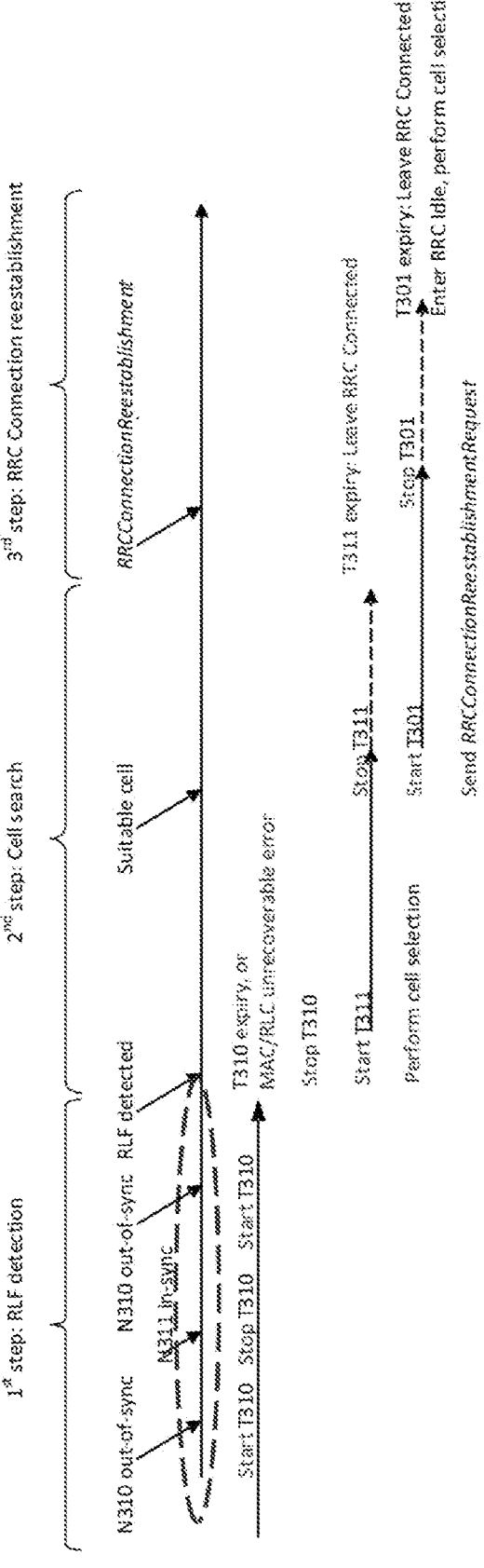
FIG. 1 illustrates RLF and RRC connection re-establishment procedures.
Figure 2:
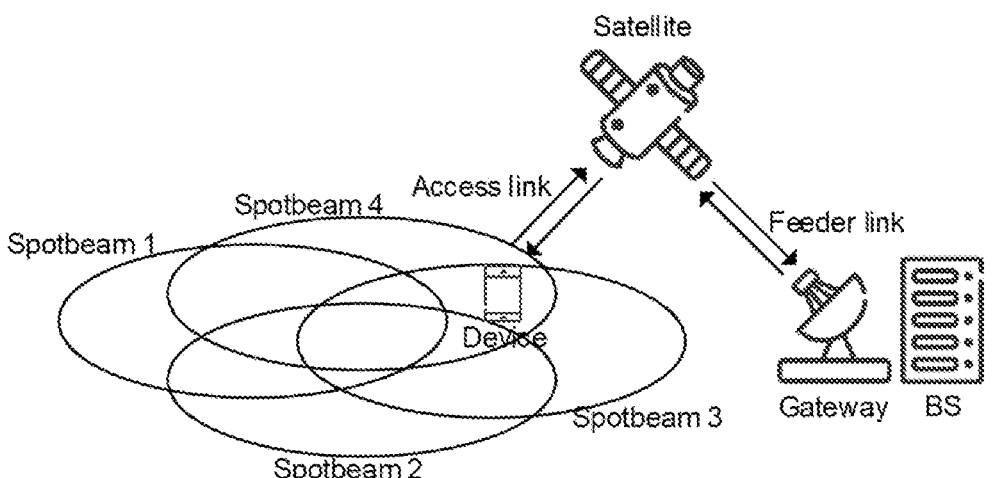
FIG. 2 illustrates an example architecture of a satellite network with bent pipe transponders.
Figure 3:
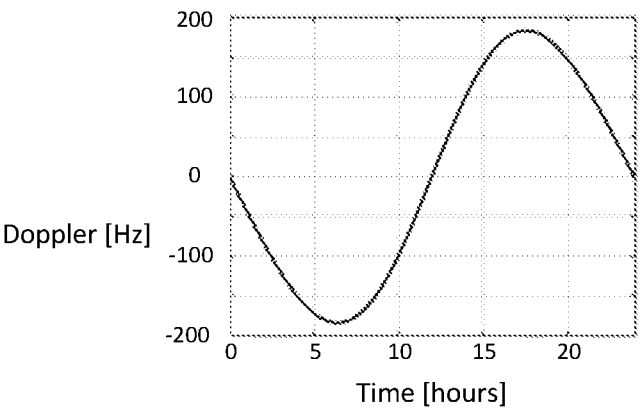
FIG. 3 illustrates an example of the diurnal Doppler shift of the forward service link observed for a GEO satellite operating from an inclined orbit.
Figure 4:
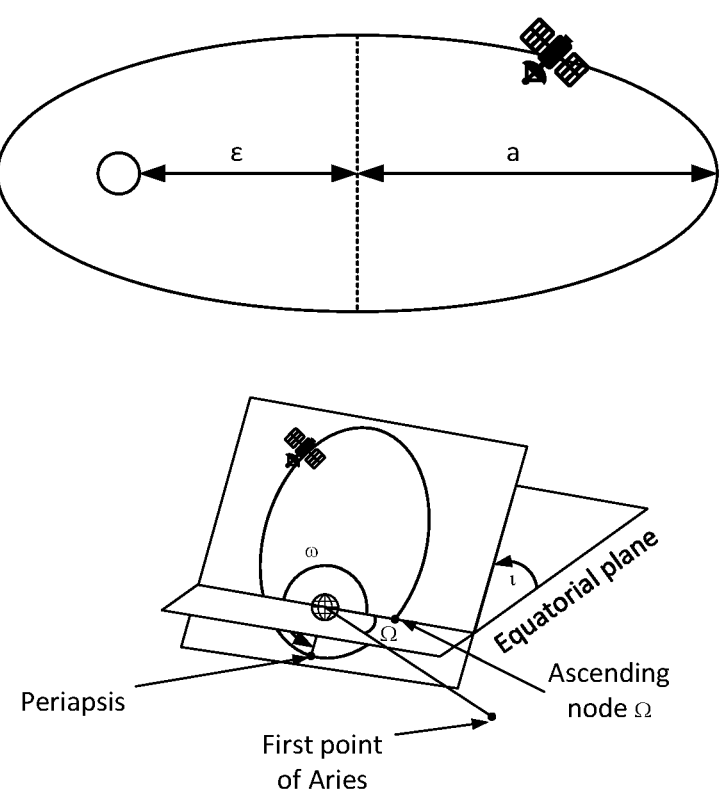
FIG. 4 illustrates a set of parameters describing a satellite orbit.

Certain challenges need to be addressed when evolving cellular IoT technologies such as eMTC and NB-IoT to support NTN: moving satellites (resulting in moving cells or switching cells), long propagation delays, and large Doppler shifts.

With regard to moving satellites (resulting in moving or switching cells), the default assumption in terrestrial network design, e.g. NR or LTE, is that cells are stationary. This is not the case in NTN, especially when LEO satellites are considered. A LEO satellite may be visible to a UE on the ground only for a few seconds or minutes. There are two different options for LEO deployment. The beam/cell coverage is fixed with respect to a geographical location with earth-fixed beams, i.e. steerable beams from satellites ensure that a certain beam covers the same geographical area even as the satellite moves in relation to the surface of the earth. On the other hand, with moving beams a LEO satellite has fixed antenna pointing direction in relation to the earth's surface, e.g. perpendicular to the earth's surface, and thus cell/beam coverage sweeps the earth as the satellite moves. In that case, the spotbeam, which is serving the UE, may switch every few seconds.

The propagation delays in terrestrial mobile systems are usually less than 1 millisecond. In contrast, the propagation delays in NTN can be much longer, ranging from several milliseconds (LEO) to hundreds of milliseconds (GEO) depending on the altitudes of the spaceborne or airborne platforms deployed in the NTN.

The movements of the spaceborne or airborne platforms deployed in NTN may result in large Doppler shifts. For example, a LEO satellite at the height of 600 km can lead to a time-varying Doppler shift as large as 24 ppm.

Yet another challenge related to the "moving satellite" aspect mentioned above is that when the responsibility for covering a certain geographical cell area in the earth fixed beam case switches from one satellite to another, preferably with a short period of overlap (i.e. both the old and the new satellite cover the cell area simultaneously), this may be assumed to involve a cell change, e.g. change of PCI, which means that all UEs in connected mode that are served by the old cell (to/via the old satellite) have to be handed over to the new cell (and the new satellite) in a short time (i.e. the period of overlap), which may cause a high load peak on RACH resources, random access processing resources and processing resources for handover preparation associated with the new cell. If these resources are overloaded, the consequences may involve e.g. extended interruption times, handover and radio link failures.

In Rel-16, during the study item phase, RAN2 discussed the mobility procedures to find solutions to address the problems that may occur due to the challenges mentioned above for NTN with the motivation to reduce service interruption during handover due to large propagation delay and high handover rates, to introduce mechanisms to improve handover robustness due to small signal strength variation in regions of beam overlap and to compensate for propagation delay differences in the UE measurement windows between cells/beams originating from different satellites. This is especially the case for LEO NTN. In the technical report, which was concluded during the SI phase in Rel-16, aspects related to additional triggering conditions for conditional handover mechanism, adaptation of measurement-based thresholds and events, mobility related configuration, measurement configuration/reporting, and service continuity for mobility between TN and NTN are captured.

Considering the large cell sizes in non-terrestrial networks, it might be a difficult problem for the source eNB/gNB to send HO commands to a large number of UEs respectively in a short time. A group of such UEs may not be able to perform HO on time; as a result, radio link failure may be detected and UEs initiate the RRC re-establishment procedure. Restoring the RRC connection may take a long time considering that it involves not only the RRC re-establishment procedure but also the time it takes for the RLF detection and the cell selection and on top of that the long propagation delays during the message exchange. It is also possible that re-establishment procedure may fail. In short, this has an impact on service continuity.

Note that in NB-IoT there is no support for mobility, therefore only RLF would be triggered in connected mode followed by RRC re-establishment. The UE will search for a cell after RLF is declared to initiate the RRC connection re-establishment procedure. This procedure is used for both user plane, e.g., RRC resume, and control plane, e.g., DoNAS, solutions and it allows retrieval of UE context and recovery of undelivered data.

Certain aspects of the present disclosure and their embodiments may provide solutions to these or other challenges. For example, according to certain embodiments, methods and systems are provided that reduce the time taken to perform cell selection after RLF (prior to triggering RRC connection re-establishment) in IoT non-terrestrial networks.

According to certain embodiments, the methods and systems described herein introduce means to provide information to the UE (e.g., guidance to expedite cell selection) so that cell selection can be performed faster after RLF, prior to RRC connection re-establishment. The overall service interruption would then be shorter when compared to legacy.

Certain embodiments may provide one or more technical advantages. For example, one technical advantage may be that certain embodiments reduce the overall service interruption compared to legacy by reducing the time it takes to perform cell selection after RLF, prior to RRC connection re-establishment. RLF followed by RRC connection re-establishment may also be beneficial as an alternative means for handover in case handover procedure cannot be performed by a large number of UEs during a service or feeder link switch.

Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. According to certain embodiments, In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

The embodiments outlined below are described mainly in terms of LTE based (including IoT) NTNs, but they are equally applicable in a NTN based on NR (including IoT) technology.

The term "network" is used in the solution description to refer to a network node, which typically will be an eNB (e.g. in a LTE based NTN), but which may also be a gNB (e.g. in a NR based NTN), or a base station or an access point in another type of network, or any other network node with the ability to directly or indirectly communicate with a UE.

Global Navigation Satellite Systems (GNSS) have an important role to play in the proposed solutions. The most well-known is the American Global Positioning System (GPS), but there are also other also other similar systems which could provide the functionality utilized in the proposed solution, e.g. the Russian Global Navigation Satellite System (GLONASS), the Chinese BeiDou Navigation Satellite System and the European Galileo.

The terms "idle mode" and "RRC_IDLE state" are used interchangeably in this document.

A frequently used expression, or concept, in this solution description is "expected time to be served". Equivalent expressions for the same concept include "expected time to be served with sufficient channel quality", "expected time to be served with sufficiently good channel quality", "expected time to be covered", "expected time to be covered with sufficient channel quality", "expected time to be covered with sufficiently good channel quality", "expected coverage time", "expected coverage time with sufficient channel quality", "expected coverage time with sufficiently good channel quality". In these expressions, "sufficient channel quality" and "sufficiently good channel quality" may refer to a channel quality that exceeds one or more threshold value(s), e.g. related to a UE's perceived RSRP, RSRQ, SINR or RSSI (or a pathloss threshold which the UE's experienced or estimated pathloss should be below in order for the channel quality to be sufficient or sufficiently good).

For convenience of writing, the term "satellite" is often used even when a more appropriate term would be "gNB associated with the satellite". Here, gNB associated with a satellite might include both a regenerative satellite, where the gNB is the satellite payload, the gNB is integrated with the satellite, or a transparent satellite, where the satellite payload is a relay and gNB is on the ground (i.e. the satellite relays the communication between the gNB on the ground and the UE.

The term signal or radio signal used herein can be any physical signal or physical channel Examples of DL physical signals are reference signal (RS) such as NPSS, NSSS, NRS, CSI-RS, DMRS, signals in SSB, DRS, CRS, PRS etc. Examples of UL physical signals are reference signal such as SRS, DMRS etc. The term physical channel refers to any channel carrying higher layer information e.g. data, control etc. Examples of physical channels are PBCH, NPBCH, PDCCH, PDSCH, MPDCCH, NPDCCH, NPDSCH, E-PDCCH, PUSCH, PUCCH, NPUSCH etc.

The term carrier frequency used herein refer to a frequency of a cell which can be a serving cell or a non-serving cell. In TDD the same carrier frequency is used in UL and DL for the same cell. In FDD or HD-FDD different carrier frequencies are used in UL and DL for the same cell. One or a plurality of cells can operate on the same carrier frequency. The carrier frequency may also be called as simply carrier, frequency, frequency channel, radio channel etc. The carrier frequency can be indicated or signaled by the network to the UE or by the UE to network (e.g. with measurement results) by a carrier frequency number or identifier or radio channel number or identifier called as ARFCN or EARFCN etc. There is separate ARFCN or EARFCN for UL and DL in FDD or HD-FDD.

The UE performs measurements on one or more reference signal (RS) transmitted in a cell, which can be serving cell or neighbour cell. The measured cell can operate on or belong to the serving carrier frequency (e.g. an intra-frequency carrier) or it can operate on or belong to the non-serving carrier frequency (e.g. an inter-frequency carrier, inter-RAT carrier etc). Examples of RS are given above. Examples of measurements are cell identification (e.g. PCI acquisition, cell detection), Reference Symbol Received Power (RSRP), Reference Symbol Received Quality (RSRQ), secondary synchronization RSRP (SS-RSRP), narrowband RSRP (NRSRP), narrowband RSRQ (NRSRQ), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

The term measurement occasion (MO) used herein comprising any time instance or time duration over which the UE can perform one or more measurements on signals of one or more cells. MO can be expressed in terms of a duration e.g. X1 seconds or ms, X2 number of time resources. The MO can occur periodically or aperiodically. The MO may also be called as measurement opportunity, measurement resources, measurement instances etc.

The term serving cell inactive time resources used herein may also be simply called as inactive time resources or inactive resources. During the inactive time resources the UE is not expected to operate signals in the serving cell. UE operating a signal in a serving cell comprising receiving signal and/or transmitting signal in the serving cell. More specifically during the inactive time resources the UE is not expected to be scheduled for receiving and/or transmitting signals in the serving cell. On the other hand during active time resources the UE can be scheduled in the serving cell. Examples of inactive time resources are DRX inactive time, invalid time resources (ITR), UL gaps for DL synchronization etc. The inactive time resource may also be called as inactive time period, inactive time duration, inactive time occasion etc.

The term invalid time resource (ITR) used herein comprising length of time or one or a plurality of time resources (e.g. slots, subframes etc.) over which the UE is not expected to be scheduled even if they fully or partially overlap in time with DRX active time. Examples of ITR comprising one or more of: unused subframes between UL and DL in HD-FDD when switching between UL and DL, subframes occurring between control channel search spaces (e.g. between NPDCCH reception occasions), or subframes not indicated in 'NB-IoT DL subframe' bitmap configured by the network, etc.

It should be noted that the embodiments below are for cell selection for RRC connection re-establishment during T311 or a new timer and not idle mode cell selection.

Cell Selection for Re-Establishment During T311 or New Timer

According to certain embodiments, cell search is assisted/accelerated with information provided by the network implicitly, e.g., via ephemeris data, or explicitly, to identify the next cell so that cell search for reestablishment can be completed faster. The UE would then need to search only for the cell(s) provided by the network. This information may include e.g. any of the carrier frequency, the PCI, ephemeris data of the satellite serving the new cell (e.g. to allow the UE to point a receiver beam in the correct direction), timing of SSB transmissions (e.g. SMTC). In some employments, the information to facilitate cell search/selection can as well be an indication that no suitable cell is available, e.g., in case of patchy coverage, so that the UE can move to RRC_IDLE state faster before an extensive search for cell selection e.g., during T311. In a variant, the timer T311 is scaled so that the UE terminates cell search earlier and moves to RRC_IDLE state. In another variant, a new timer is introduced instead of scaling T311. This information or the related configuration can be provided via system information broadcast or dedicated signaling. In a variant, whether reduced/scaled value of T311 or a new timer is applied may be tied to the ephemeris data which gives information on satellite/cell coverage, optionally together with the UE's location or the previous cell (PCI) the UE was camping on or had an RRC connection to.

According to certain embodiments, the timer T311 is scaled up so that it is extended in case the coverage is patchy but next suitable cell is available soon enough for the UE to wait before moving to RRC_IDLE state. In a variant, a new timer is introduced instead of scaling T311 up. In another variant, a new timer is introduced which upon expiry starts the cell selection procedure, which also offsets the start of T311. This information or the related configuration can be provided via system information broadcast or dedicated signaling, e.g. in an RRCReconfiguration message.

In a particular embodiment, the usage of an extended or scaled T311, or new T311 timer is based on the coverage extension (CE) level of the UE. Thus, if the UE is in in bad coverage, a longer T311 or extended T311 can be used. This allows a UE that is in bad coverage to search for many satellites, (for instance in deep coverage or in a valley) to wait for longer before going to RRC_IDLE state. The coverage extension (CE) level used for determining this can be based on the CE mode UE was in the previous cell when in connected mode.

In a particular embodiment, UE applies new timer or scales T311 or applies new value for T311, or restarts T311 or new timer based on UEs location that may be GNSS based location. This location may be relative to cell reference center or relative to previous serving reference center and a neighbor cell reference center or another network provided reference location, or predetermined reference location.

In yet another particular embodiment, UE applies new timer or scales T311 or applies new value for T311, or restarts T311 or new timer based on RSRP, RSRQ or SINR measurement of the previous serving cell. E.g. if UE is not able to detect the previous serving cell SSB(NR)/CRS(LTE) which would happen in case UE is not aware or does not consider the Tservice and previous serving cell has stopped serving the area.

In a further particular embodiment, the serving cell may provide all or selected parts of the system information of the next cell to serve the same area in the earth fixed beams deployment case. This may be provided in the broadcast system information or using dedicated signaling, e.g. an RRCReconfigurationMessage. If the next cell is served by a different gNB than the old/serving cell, the old/serving gNB may have received this information through a new inter-gNB message exchange procedure (e.g. a new XnAP procedure).

Figure 5:
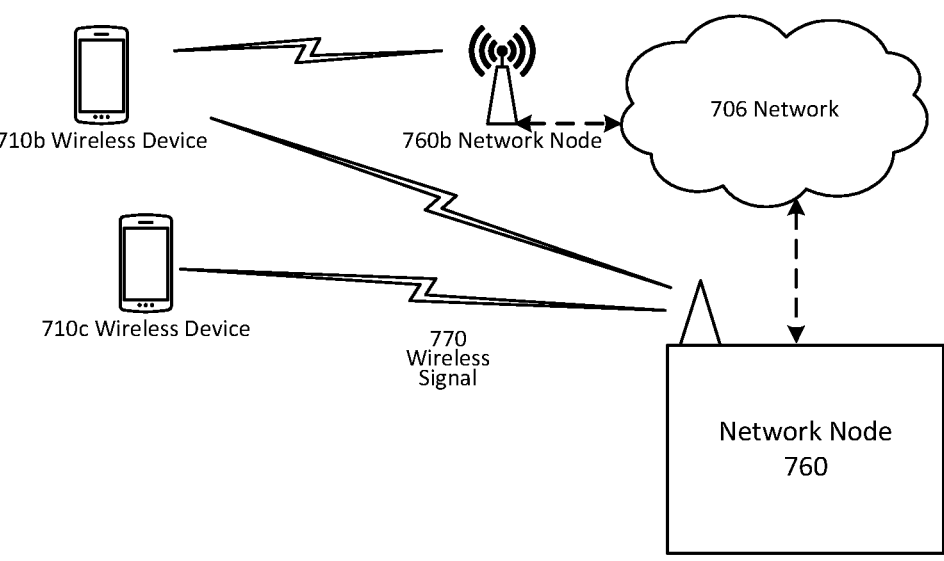
FIG. 5 illustrates a wireless network, in accordance with some embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 706, network nodes 760 and 760b, and wireless devices 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and wireless device 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
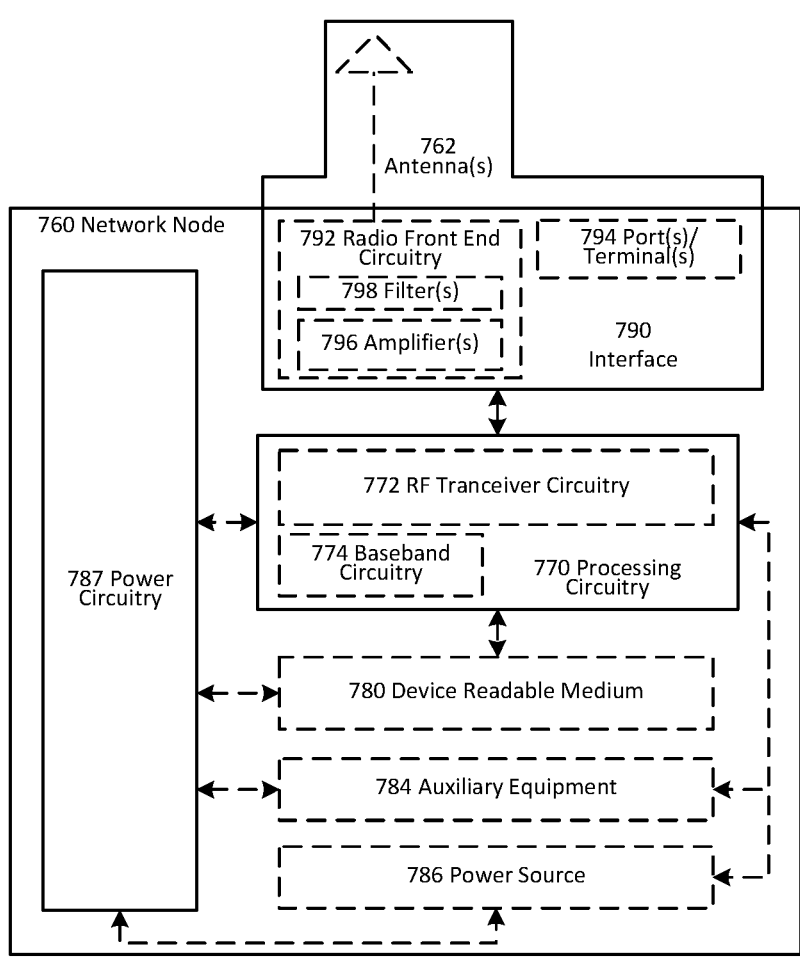
FIG. 6 illustrates an example network node according to certain embodiments.

FIG. 6 illustrates an example network node 760, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 760 includes processing circuitry 770, device readable medium 780, interface 790, auxiliary equipment 784, power source 786, power circuitry 787, and antenna 762. Although network node 760 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner In any of those embodiments, whether executing instructions stored on a device readable storage medium or not, processing circuitry 770 can be configured to perform the described functionality. The benefits provided by such functionality are not limited to processing circuitry 770 alone or to other components of network node 760 but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or wireless devices 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or wireless devices via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 792 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 6 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

Figure 7:
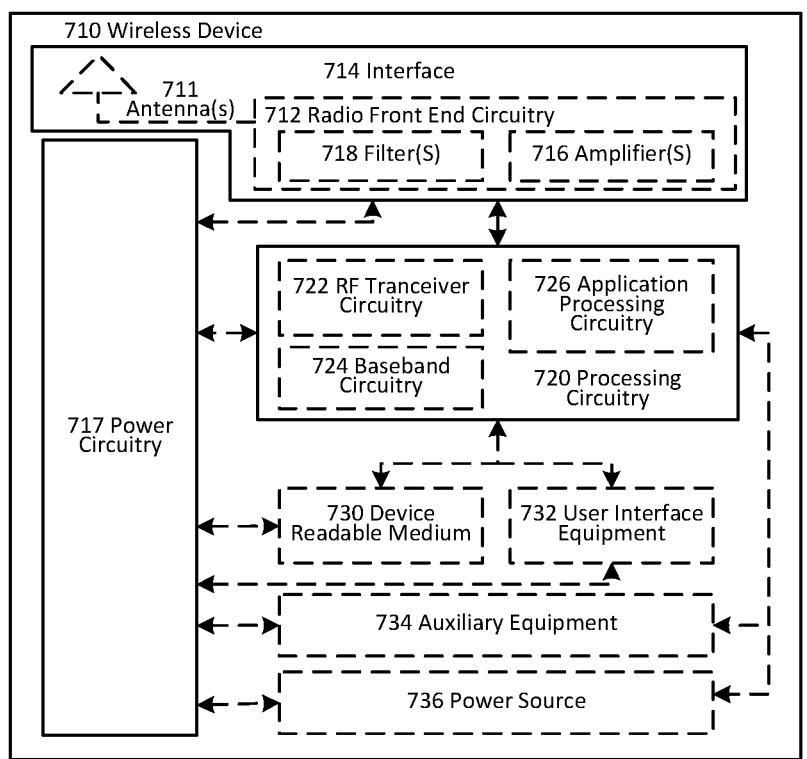
FIG. 7 illustrates an example wireless device a According to certain embodiments.

FIG. 7 illustrates an example wireless device 710 according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. Wireless device 710 may include multiple sets of one or more of the illustrated components for different wireless technologies supported by wireless device 710, such as, for example, GSM, WCDMA, LTE, NR, WiFi, WiMAX, or Bluetooth wireless technologies, just to mention a few. These wireless technologies may be integrated into the same or different chips or set of chips as other components within wireless device 710.

Antenna 711 may include one or more antennas or antenna arrays, configured to send and/or receive wireless signals, and is connected to interface 714. In certain alternative embodiments, antenna 711 may be separate from wireless device 710 and be connectable to wireless device 710 through an interface or port. Antenna 711, interface 714, and/or processing circuitry 720 may be configured to perform any receiving or transmitting operations described herein as being performed by a wireless device. Any information, data and/or signals may be received from a network node and/or another wireless device. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 712 is connected to antenna 711 and processing circuitry 720 and is configured to condition signals communicated between antenna 711 and processing circuitry 720. Radio front end circuitry 712 may be coupled to or a part of antenna 711. In some embodiments, wireless device 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or wireless devices via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 710 components, such as device readable medium 730, wireless device 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of wireless device 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a wireless device may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner In any of those particular embodiments, whether executing instructions stored on a device readable storage medium or not, processing circuitry 720 can be configured to perform the described functionality. The benefits provided by such functionality are not limited to processing circuitry 720 alone or to other components of wireless device 710, but are enjoyed by wireless device 710 as a whole, and/or by end users and the wireless network generally.

Processing circuitry 720 may be configured to perform any determining, calculating, or similar operations (e.g., certain obtaining operations) described herein as being performed by a wireless device. These operations, as performed by processing circuitry 720, may include processing information obtained by processing circuitry 720 by, for example, converting the obtained information into other information, comparing the obtained information or converted information to information stored by wireless device 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with wireless device

710. Such interaction may be of many forms, such as visual, audial, tactile, etc. User interface equipment 732 may be operable to produce output to the user and to allow the user to provide input to wireless device 710. The type of interaction may vary depending on the type of user interface equipment 732 installed in wireless device 710. For example, if wireless device 710 is a smart phone, the interaction may be via a touch screen; if wireless device 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into wireless device 710 and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from wireless device 710, and to allow processing circuitry 720 to output information from wireless device 710. User interface equipment 732 may include, for example, a speaker, a display, vibrating circuitry, a USB port, a headphone interface, or other output circuitry. Using one or more input and output interfaces, devices, and circuits, of user interface equipment 732, wireless device 710 may communicate with end users and/or the wireless network and allow them to benefit from the functionality described herein.

Auxiliary equipment 734 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. wireless device 710 may further comprise power circuitry 737 for delivering power from power source 736 to the various parts of wireless device 710 which need power from power source 736 to carry out any functionality described or indicated herein. Power circuitry 737 may in certain embodiments comprise power management circuitry. Power circuitry 737 may additionally or alternatively be operable to receive power from an external power source; in which case wireless device 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of wireless device 710 to which power is supplied.

Figure 8:
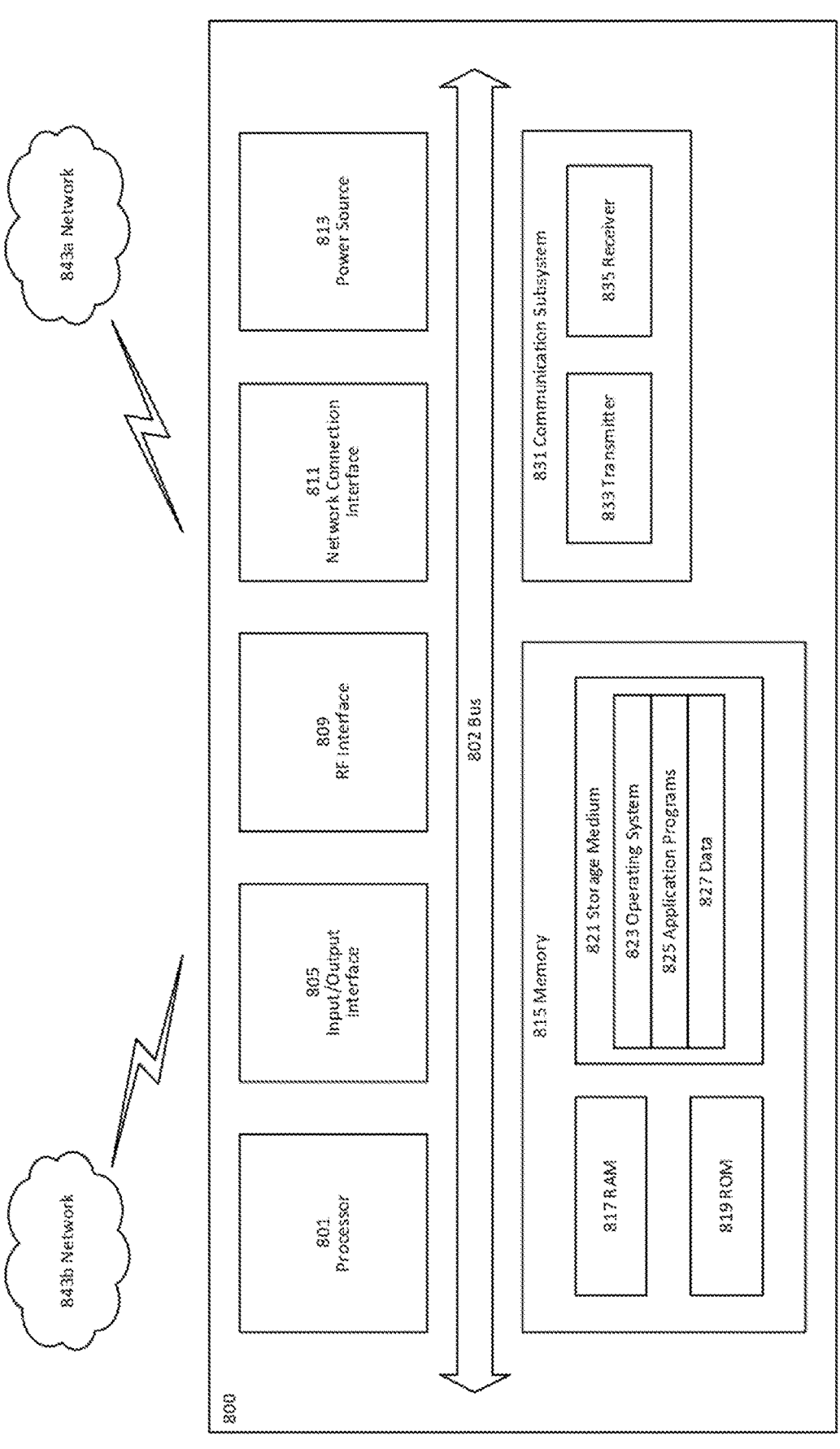
FIG. 8 illustrates an embodiment of a UE in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the 3rd Generation Partnership Project (3GPP), including a NB-IoT UE, a machine type communication (MTC) UE, and/or an enhanced MTC (eMTC) UE. UE 800, as illustrated in FIG. 6, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another wireless device, UE, or base station of a radio access network (RAN) according to one or more communication protocols, such as IEEE 802.8, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
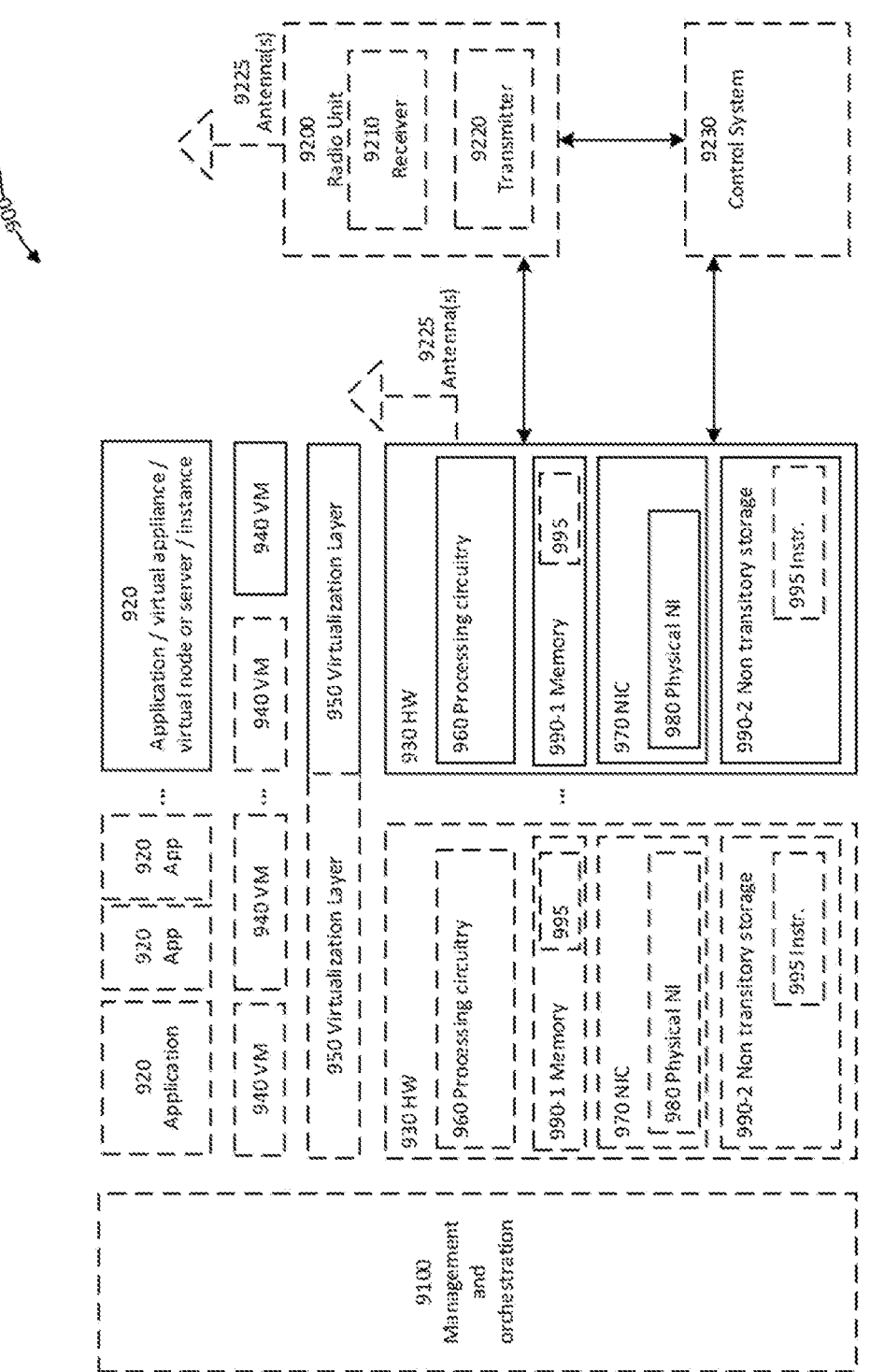
FIG. 9 is a schematic block diagram illustrating a virtualization environment in which functions implemented by some embodiments may be virtualized.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be affected with the use of control system 9230 which may alternatively be used for communication between the hardware nodes 930 and radio units 9200.

Figure 10:
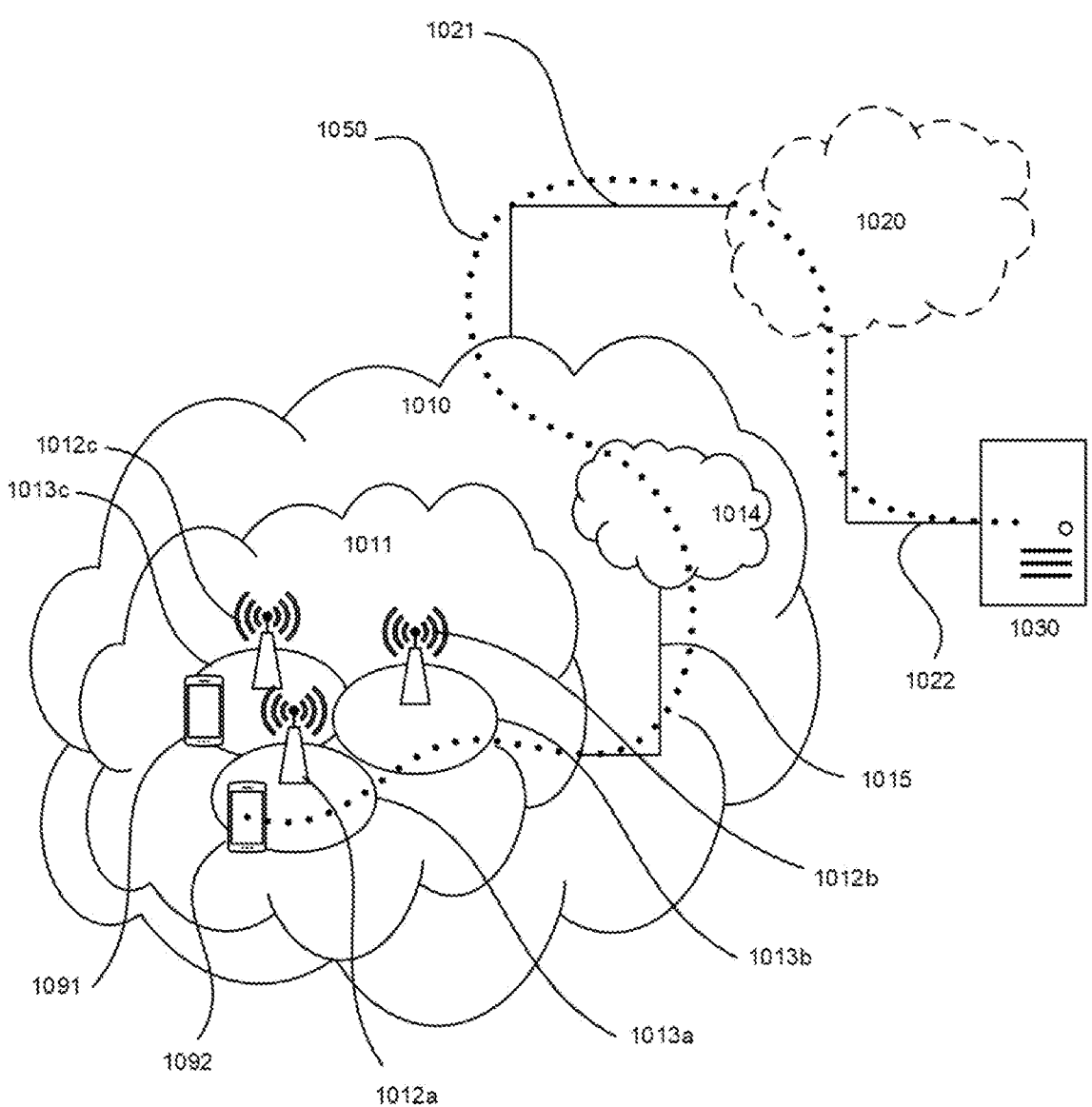
FIG. 10 illustrates a telecommunication network connected via an intermediate network to a host computer in accordance with some embodiments.

FIG. 10 illustrates a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
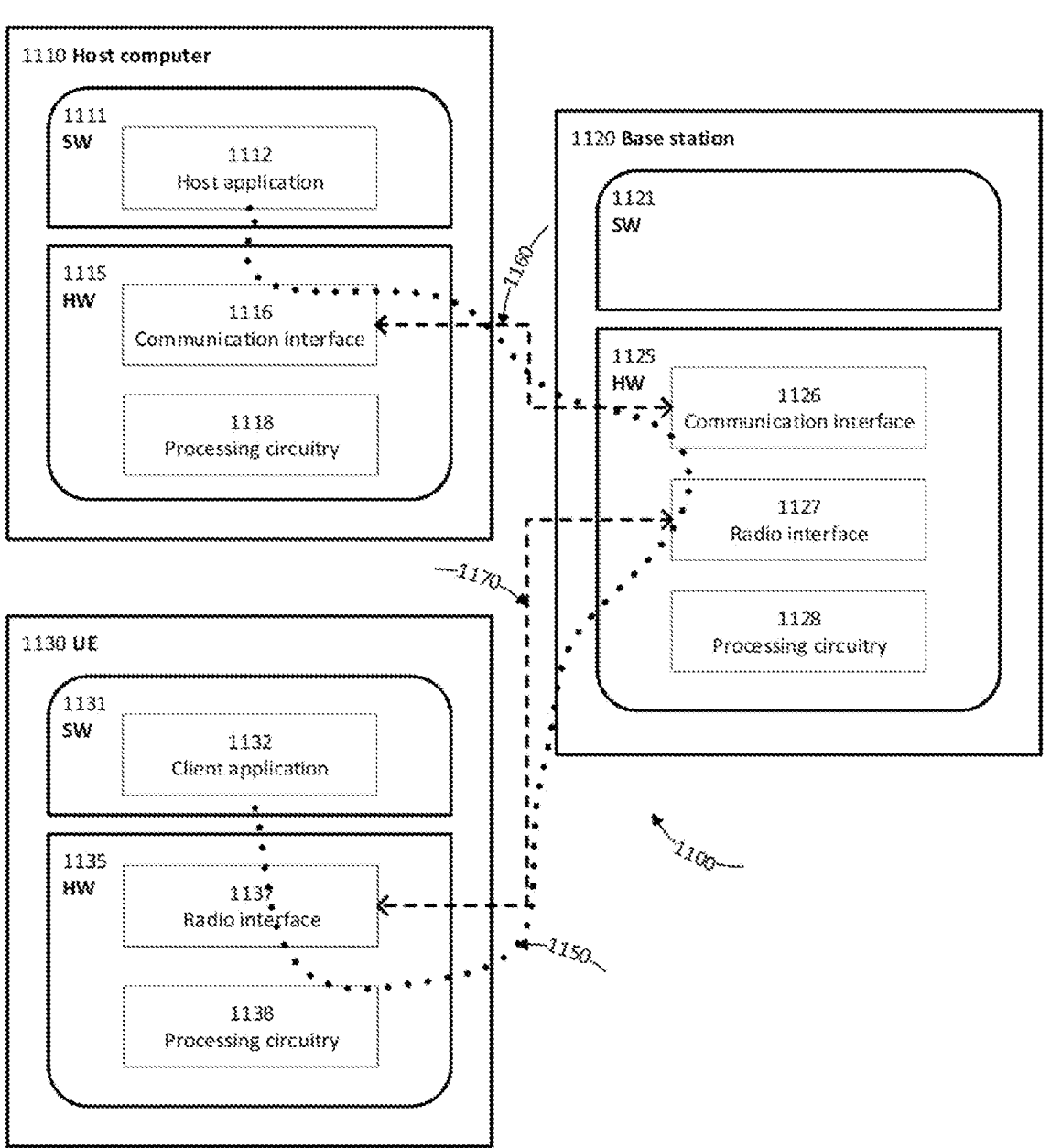
FIG. 11 illustrates a host computer communicating via a base station with a user equipment over a partially wireless connection in accordance with some embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
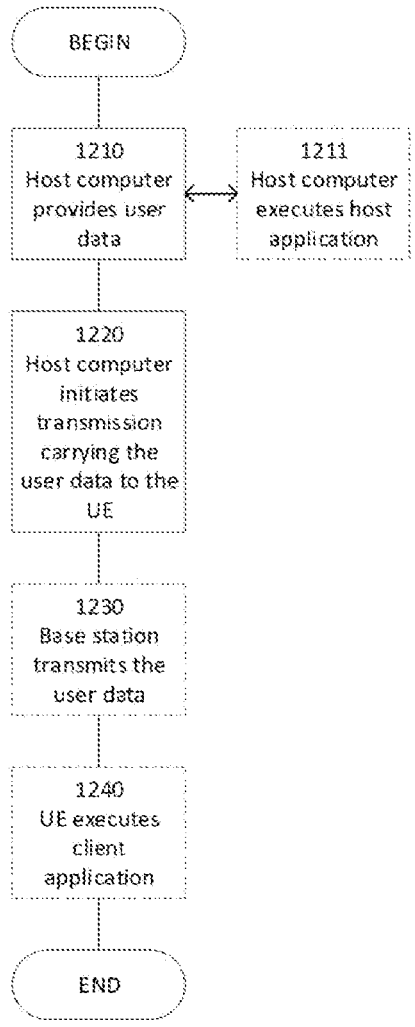
FIG. 12 is a flowchart illustrating a method implemented in a communication system according to some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
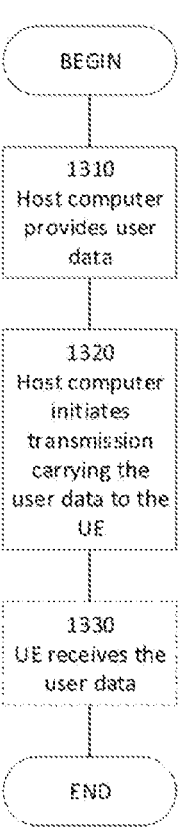
FIG. 13 is a flowchart illustrating a method implemented in a communication system according to some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
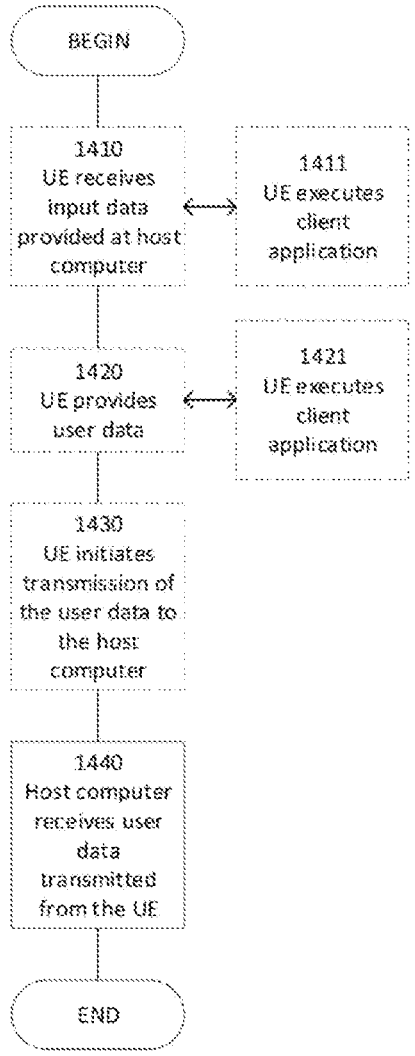
FIG. 14 is a flowchart illustrating a method implemented in a communication system according to some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
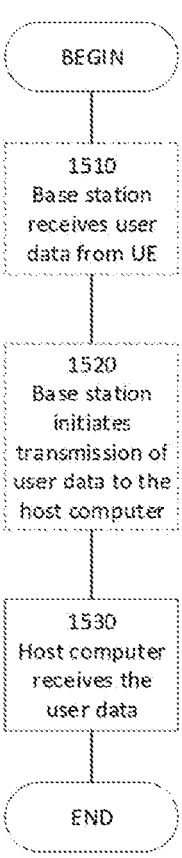
FIG. 15 is a flowchart illustrating a method implemented in a communication system according to some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Figure 16:
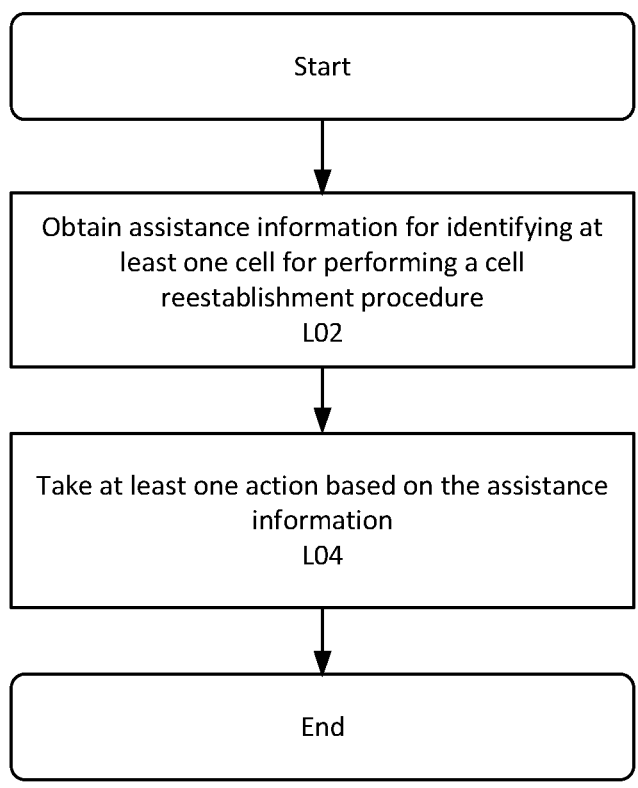
FIG. 16 depicts a method by a wireless device according to some embodiments.

FIG. 16 depicts a method by a wireless device, according to certain embodiments. At step L02, the wireless device obtains assistance information for identifying at least one cell for performing a cell reestablishment procedure. At step L04, the wireless device takes at least one action based on the assistance information. For example, according to a particular embodiment, taking the at least one action may include performing a cell search to identify a particular one of the at least one cell for performing the cell reestablishment procedure and performing the cell reestablishment procedure for the particular one of the at least one cell.

In various particular embodiments, the method may additionally or alternatively include one or more of the steps or features of the Group A and Group C Example Embodiments described below.

Figure 17:
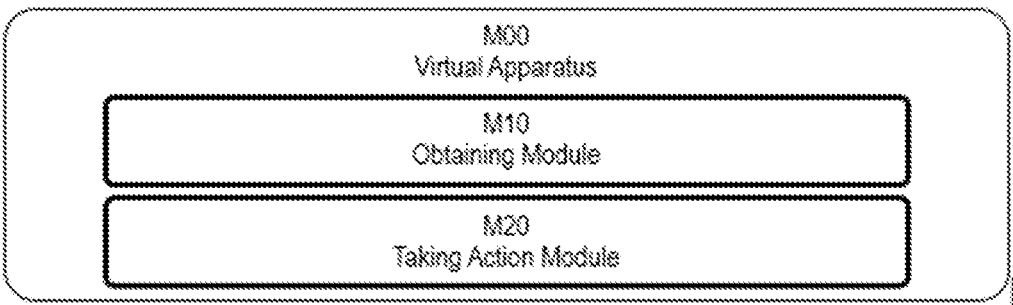
FIG. 17 illustrates a schematic block diagram of a virtual apparatus MOO in a wireless network according to some embodiments.

FIG. 17 illustrates a schematic block diagram of a virtual apparatus MOO in a wireless network (for example, the wireless network shown in FIG. 5). The apparatus may be implemented in a wireless device or network node (e.g., wireless device 710 or network node 760 shown in FIG. 5). Apparatus M00 is operable to carry out the example method described with reference to FIG. 16 and possibly any other processes or methods disclosed herein. It is also to be understood that the method of FIG. 16 is not necessarily carried out solely by apparatus M00. At least some operations of the method can be performed by one or more other entities.

Virtual Apparatus M00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module M10, taking action module M20, and any other suitable units of apparatus M00 to perform corresponding functions according one or more embodiments of the present disclosure.

According to certain embodiments, obtaining module M10 may perform certain of the obtaining functions of the apparatus M00. For example, obtaining module M10 may obtain assistance information for identifying at least one cell for performing a cell reestablishment procedure.

According to certain embodiments, taking action module M20 may perform certain of the taking action functions of the apparatus M00. For example, taking action module M20 may take at least one action based on the assistance information. For example, according to a particular embodiment, taking the at least one action may include performing a cell search to identify a particular one of the at least one cell for performing the cell reestablishment procedure and performing the cell reestablishment procedure for the particular one of the at least one cell.

Optionally, in particular embodiments, virtual apparatus may additionally include one or more modules for performing any of the steps or providing any of the features in the Group A and Group C Example Embodiments described below.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 18 depicts a method by a network node, according to certain embodiments. At step N02, the network node transmits, to a wireless device, assistance information for identifying at least one cell for performing a cell reestablishment procedure. In a particular embodiment, the network node configures the wireless device to perform a cell search to identify at least one cell for performing the cell reestablishment procedure based on the assistance information.

In various particular embodiments, the method may include one or more of any of the steps or features of the Group B and Group C Example Embodiments described below.

FIG. 19 illustrates a schematic block diagram of a virtual apparatus P00 in a wireless network (for example, the wireless network shown in FIG. 5). The apparatus may be implemented in a wireless device or network node (e.g., wireless device 710 or network node 760 shown in FIG. 5). Apparatus P00 is operable to carry out the example method described with reference to FIG. 18 and possibly any other processes or methods disclosed herein. It is also to be understood that the method of FIG. 18 is not necessarily carried out solely by apparatus P00. At least some operations of the method can be performed by one or more other entities.

Virtual Apparatus P00 may comprise processing circuitry, which may include one or more microprocessor or micro-controllers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module P10 and any other suitable units of apparatus P00 to perform corresponding functions according one or more embodiments of the present disclosure.

According to certain embodiments, transmitting module P10 may perform certain of the transmitting functions of the apparatus P00. For example, transmitting module P10 may transmit, to a wireless device, assistance information for identifying at least one cell for performing a cell reestablishment procedure. In a particular embodiment, the network node configures the wireless device to perform a cell search to identify at least one cell for performing the cell reestablishment procedure based on the assistance information.

Optionally, in particular embodiments, virtual apparatus may additionally include one or more modules for performing any of the steps or providing any of the features in the Group B and Group C Example Embodiments described below.

EXAMPLE EMBODIMENTS

Group A Example Embodiments

Example A1. A method by a wireless device comprising:
obtaining assistance information for identifying at least one cell for performing a cell reestablishment procedure; and
taking at least one action based on the assistance information.

Example A2. The method of Example Embodiment A1, wherein taking the at least one action comprises:
performing a cell search to identify a particular one of the at least one cell for performing the cell reestablishment procedure; and
performing the cell reestablishment procedure for the particular one of the at least one cell.

Example A3. The method of any one of Example Embodiments A1 to A2, further comprising: obtaining ephemeris data and determining the at least one cell based on the ephemeris data.

Example A4. The method of Example Embodiment A3, wherein the ephemeris data is obtained from a network node.

Example A5. The method of any one of Example Embodiments A1 to A4, wherein obtaining the assistance information comprises receiving the assistance information from a network node.

Example A6. The method of any one of Example Embodiments A1 to A5, wherein the assistance information indicates the at least one cell.

Example A1a. The method of any one of Example Embodiments A1 to A6, wherein the assistance information comprises at least one of: a carrier frequency, a PCI, ephemeris data of the satellite serving the new cell (e.g. to allow the UE to point a receiver beam in the correct direction), and a timing of SSB transmissions.

Example A1b. The method of Example Embodiment A1 to A5, wherein the assistance information indicates that no cell is available, and the method further comprises transitioning to an inactive or idle state.

Example A8. The method of any one of Embodiments A1 to A6, wherein performing the at least one action comprises scaling an amount of time associated with a timer that measures a time associated with a cell search procedure.

Example A9. The method of Example Embodiment A8, wherein scaling the amount of time associated with the timer comprises reducing the amount of time associated with the timer.

Example A10. The method of any one of Example Embodiments A1 to A6, wherein performing the at least one action comprises increasing an amount of time associated with a timer that measures a time associated with a cell search procedure.

Example A11. The method of any one of Example Embodiments A1 to A10, further comprising obtaining information indicating a coverage extension level of the wireless device, and wherein the at least one action is taken based on the information indicating the coverage extension level.

Example A12. The method of Example Embodiment A11, wherein the coverage extension level indicates that the wireless device has a coverage level that is less than a threshold, and wherein taking the at least one action comprises increasing an amount of time associated with a timer associated with performing a cell search.

Example A13. The method of Example Embodiment A11, wherein the coverage extension level indicates that the wireless device has a coverage level that is greater than a threshold, and wherein taking the at least one action comprises decreasing an amount of time associated with a timer associated with performing a cell search.

Example A14. The method of any one of Example Embodiments A1 to A10, further comprising obtaining information indicating a location of the wireless device, and wherein the at least one action is taken based on the information indicating the location.

Example A15. The method of Example Embodiment A14, wherein taking the at least one action comprises increasing an amount of time associated with a timer associated with performing a cell search based on the location of the wireless device.

Example A16. The method of Example Embodiment A14, wherein taking the at least one action comprises decreasing an amount of time associated with a timer associated with performing a cell search based on the location of the wireless device.

Example A17. The method of any one of Example Embodiments A1 to A16, further comprising obtaining information indicating a signal measurement associated with the wireless device, and wherein the at least one action is taken based on the information indicating the signal measurement.

Example A18. The method of Example Embodiment A17, wherein taking the at least one action comprises increasing an amount of time associated with a timer associated with performing a cell search based on the signal measurement.

Example A19. The method of Example Embodiment A17, wherein taking the at least one action comprises decreasing an amount of time associated with a timer associated with performing a cell search based on the signal measurement.

Example A20. The method of any one of Example Embodiments A1 to A19, further comprising receiving system information for at least one cell identified during a cell reestablishment procedure.

Example A21. The method of any one of Example Embodiments A1 to A20, wherein the wireless device comprises a user equipment (UE).

Example A22. A wireless device comprising processing circuitry configured to perform any of the methods of Example Embodiments A1 to A21.

Example A23. A computer program comprising instructions which when executed on a computer perform any of the methods of Example Embodiments A1 to A21.

Example A24. A computer program product comprising computer program, the computer program comprising instructions which when executed on a computer perform any of the methods of Example Embodiments A1 to A21.

Example A25. A non-transitory computer readable medium storing instructions which when executed by a computer perform any of the methods of Example Embodiments A1 to A21.

Group B Embodiments

Example B1. A method by a network node comprising:
transmitting, to a wireless device, assistance information for identifying at least one cell for performing a cell reestablishment procedure.

Example B2. The method of Example Embodiment B1, further comprising configuring the wireless device to performing a cell search to identify at least one cell for performing the cell reestablishment procedure based on the assistance information.

Example B3. The method of any one of Example Embodiments B1 to B2, wherein the assistance information comprises ephemeris data, and the method further comprises configuring the wireless device to determine at least one cell based on the ephemeris data.

Example B4. The method of any one of Example Embodiments B1 to B3, wherein the assistance information indicates at least one cell for performing a cell reestablishment procedure.

Example B5. The method of any one of Example Embodiments B1 to B4, wherein the assistance information comprises at least one of: a carrier frequency, a PCI, ephemeris data of the satellite serving the new cell (e.g. to allow the UE to point a receiver beam in the correct direction), and a timing of SSB transmissions.

Example B6. The method of Example Embodiment B1 to B5, wherein the assistance information indicates that no cell is available, and the method further comprises configuring the wireless device to transition to an inactive or idle state when the assistance information indicates that no cell is available.

Example B7. The method of any one of Embodiments B1 to B6, further comprising configuring the wireless device to scale an amount of time associated with a timer associated with a cell search procedure based on the assistance information.

Example B8. The method of Example Embodiment B7, wherein configuring the wireless device to scale the amount of time associated with the timer comprises configuring the wireless device to reduce the amount of time associated with the timer.

Example B9. The method of any one of Example Embodiments B1 to B6, further comprising configuring the wireless device to increase an amount of time associated with a timer for performing a cell search procedure based on the assistance information.

Example B10. The method of any one of Example Embodiments B1 to B9, wherein the assistance information comprises a coverage extension level of the wireless device and/or a threshold associated with a coverage extension level, and the method further comprises configuring the wireless device to take at least one action based on the coverage extension level and/or the threshold.

Example B11. The method of Example Embodiment B10, wherein the at least one action comprises increasing an amount of time associated with a timer associated with performing a cell search.

Example B12. The method of Example Embodiment B10, wherein the at least one action comprises decreasing an amount of time associated with a timer associated with performing a cell search.

Example B13. The method of any one of Example Embodiments B1 to B12, wherein the assistance information comprises a location of the wireless device and/or a threshold or range associated with the location, and wherein the method further comprises taking at least one action based on a location of the wireless device and/or the threshold or range associated with the location.

Example B14. The method of Example Embodiment B13, wherein taking the at least one action comprises increasing an amount of time associated with a timer associated with performing a cell search based on the location of the wireless device.

Example B15. The method of Example Embodiment B13, wherein taking the at least one action comprises decreasing an amount of time associated with a timer associated with performing a cell search based on the location of the wireless device.

Example B16. The method of any one of Example Embodiments B1 to B15, wherein the assistance information comprises a threshold for comparison to a signal measurement associated with the wireless device, and the method further comprises configuring the wireless device to take at least one action based on the comparison.

Example B17. The method of Example Embodiment B16, wherein taking the at least one action comprises increasing an amount of time associated with a timer for performing a cell search.

Example B18. The method of Example Embodiment B16, wherein taking the at least one action comprises decreasing an amount of time associated with a timer for performing a cell search.

Example B19. The method of any one of Example Embodiments B1 to B18, further comprising transmitting, to the wireless device, system information for at least one cell identified during a cell reestablishment procedure.

Example B20. The method of any one of Example Embodiments B1 to B19, wherein the wireless device comprises a user equipment (UE).

Example B21. The method of any one of Example Embodiments B1 to B20, wherein the network node comprises a gNodeB (gNB).

Example B22. A network node comprising processing circuitry configured to perform any of the methods of Example Embodiments B1 to B21.

Example B23. A computer program comprising instructions which when executed on a computer perform any of the methods of Example Embodiments B1 to B21.

Example B24. A computer program product comprising computer program, the computer program comprising instructions which when executed on a computer perform any of the methods of Example Embodiments B1 to B21.

Example B25. A non-transitory computer readable medium storing instructions which when executed by a computer perform any of the methods of Example Embodiments B1 to B22.

Group C Example Embodiments

Example C1. A wireless device comprising:
processing circuitry configured to perform any of the steps of any of the Group A Example Embodiments; and
power supply circuitry configured to supply power to the wireless device.

Example C2. A network node comprising:
processing circuitry configured to perform any of the steps of any of the Group B Example Embodiments;
power supply circuitry configured to supply power to the wireless device.

Example C3. A wireless device, the wireless device comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A Example Embodiments;
an input interface connected to the processing circuitry and configured to allow input of information into the wireless device to be processed by the processing circuitry;
an output interface connected to the processing circuitry and configured to output information from the wireless device that has been processed by the processing circuitry; and
a battery connected to the processing circuitry and configured to supply power to the wireless device.

Example C4. A communication system including a host computer comprising:
processing circuitry configured to provide user data; and
a communication interface configured to forward the user data to a cellular network for transmission to a wireless device,
wherein the cellular network comprises a network node having a radio interface and processing circuitry, the network node's processing circuitry configured to perform any of the steps of any of the Group B Example Embodiments.

Example C5. The communication system of the pervious embodiment further including the network node.

Example C6. The communication system of the previous 2 embodiments, further including the wireless device, wherein the wireless device is configured to communicate with the network node.

Example C7. The communication system of the previous 3 embodiments, wherein:

the processing circuitry of the host computer is configured to execute a host application, thereby providing the user data; and the wireless device comprises processing circuitry configured to execute a client application associated with the host application.

Example C8. A method implemented in a communication system including a host computer, a network node and a wireless device, the method comprising:

at the host computer, providing user data; and at the host computer, initiating a transmission carrying the user data to the wireless device via a cellular network comprising the network node, wherein the network node performs any of the steps of any of the Group B Example Embodiments.

Example C9. The method of the previous embodiment, further comprising, at the network node, transmitting the user data.

Example C10. The method of the previous 2 embodiments, wherein the user data is provided at the host computer by executing a host application, the method further comprising, at the wireless device, executing a client application associated with the host application.

Example C11. A wireless device configured to communicate with a network node, the wireless device comprising a radio interface and processing circuitry configured to performs the of the previous 3 embodiments.

Example C12. A communication system including a host computer comprising:

processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group A Example Embodiments.

Example C13. The communication system of the previous embodiment, wherein the cellular network further includes a network node configured to communicate with the wireless device.

Example C14. The communication system of the previous 2 embodiments, wherein:

the processing circuitry of the host computer is configured to execute a host application, thereby providing the user data; and the wireless device's processing circuitry is configured to execute a client application associated with the host application.

Example C15. A method implemented in a communication system including a host computer, a network node and a wireless device, the method comprising:

at the host computer, providing user data; and at the host computer, initiating a transmission carrying the user data to the wireless device via a cellular network comprising the network node, wherein the wireless device performs any of the steps of any of the Group A Example Embodiments.

Example C16. The method of the previous embodiment, further comprising at the wireless device, receiving the user data from the network node.

Example C17. A communication system including a host computer comprising:

communication interface configured to receive user data originating from a transmission from a wireless device to a network node, wherein the wireless device comprises a radio interface and processing circuitry, the wireless device's processing circuitry configured to perform any of the steps of any of the Group A Example Embodiments.

Example C18. The communication system of the previous embodiment, further including the wireless device.

Example C19. The communication system of the previous 2 embodiments, further including the network node, wherein the network node comprises a radio interface configured to communicate with the wireless device and a communication interface configured to forward to the host computer the user data carried by a transmission from the wireless device to the network node.

Example C20. The communication system of the previous 3 embodiments, wherein:

the processing circuitry of the host computer is configured to execute a host application; and the wireless device's processing circuitry is configured to execute a client application associated with the host application, thereby providing the user data.

Example C21. The communication system of the previous 4 embodiments, wherein:

the processing circuitry of the host computer is configured to execute a host application, thereby providing request data; and the wireless device's processing circuitry is configured to execute a client application associated with the host application, thereby providing the user data in response to the request data.

Example C22. A method implemented in a communication system including a host computer, a network node and a wireless device, the method comprising:

at the host computer, receiving user data transmitted to the network node from the wireless device, wherein the wireless device performs any of the steps of any of the Group A Example Embodiments.

Example C23. The method of the previous embodiment, further comprising, at the wireless device, providing the user data to the network node.

Example C24. The method of the previous 2 embodiments, further comprising:

at the wireless device, executing a client application, thereby providing the user data to be transmitted; and at the host computer, executing a host application associated with the client application.

Example C25. The method of the previous 3 embodiments, further comprising:

at the wireless device, executing a client application; and at the wireless device, receiving input data to the client application, the input data being provided at the host computer by executing a host application associated with the client application, wherein the user data to be transmitted is provided by the client application in response to the input data.

Example C26. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group B Example Embodiments.

Example C27. The communication system of the previous embodiment further including the network node.

Example C28. The communication system of the previous 2 embodiments, further including the wireless device, wherein the wireless device is configured to communicate with the network node.

Example C29. The communication system of the previous 3 embodiments, wherein:

the processing circuitry of the host computer is configured to execute a host application;

the wireless device is configured to execute a client application associated with the host application, thereby providing the user data to be received by the host computer.

Example C30. A method implemented in a communication system including a host computer, a network node and a wireless device, the method comprising:

at the host computer, receiving, from the base station, user data originating from a transmission which the network node has received from the wireless device, wherein the wireless device performs any of the steps of any of the Group A Example Embodiments.

Example C31. The method of the previous embodiment, further comprising at the network node receiving the user data from the wireless device.

Example C32. The method of the previous 2 embodiments, further comprising at the network node, initiating a transmission of the received user data to the host computer.

Example C33. The method of any of the previous embodiments, wherein the network node comprises a base station.

Example C34. The method of any of the previous embodiments, wherein the wireless device comprises a user equipment (UE).

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
5QI 5G QoS Identifier
ABS Almost Blank Subframe
AN Access Network
AN Access Node
ANR Automatic Neighbor Relations
AP Access Point
ARQ Automatic Repeat Request
AS Access Stratum
AWGN Additive White Gaussian Noise
BCCH Broadcast Control Channel
BCH Broadcast Channel
BLER Block Error Rate
BS Base Station
BSC Base Station Controller
BTS Base Transceiver Station
CA Carrier Aggregation
CC Carrier Component
CCCH SDU Common Control Channel SDU
CDMA Code Division Multiplexing Access
CG Cell Group
CGI Cell Global Identifier/Identity
CIR Channel Impulse Response
CN Core Network
CP Cyclic Prefix CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DL-SCH Downlink Shared Channel
DM Demodulation
DMRS Demodulation Reference Signal
DRX Discontinuous Reception
DTX Discontinuous Transmission
DTCH Dedicated Traffic Channel
DUT Device Under Test
EARFCN Evolved Absolute Radio Frequency Channel Number
E-CID Enhanced Cell-ID (positioning method)
ECGI Evolved CGI
E-SMLC Evolved-Serving Mobile Location Centre
ECGI Evolved CGI
eMBB Enhanced Mobile Broadband
eNB E-UTRAN NodeB/eNodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
M2M Machine to Machine
MAC Medium Access Control
MBB Mobile Broadband
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MRTD Maximum Receive Timing Difference
MSC Mobile Switching Center
MTC Machine Type Communication
NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel

43

P-CCPCH Primary Common Control Physical Channel
PCell Primary Cell
PCFICH Physical Control Format Indicator Channel
PCH Paging Channel
PCI Physical Cell Identity/Identifier
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSCell Primary SCell
PSC Primary serving Cell
PSS Primary Synchronization Signal
PUCCH Physical Uplink Control Channel
PUSCH Physical Uplink Shared Channel
QAM Quadrature Amplitude Modulation
RACH Random Access Channel
RAB Radio Access Bearer
RAN Radio Access Network
RANAP Radio Access Network Application Part
RAT Radio Access Technology
RF Radio Frequency
RLM Radio Link Monitoring
RNC Radio Network Controller
RNTI Radio Network Temporary Identifier
RRC Radio Resource Control
RRM Radio Resource Management
RRH Remote Radio Head
RRU Remote Radio Unit
RS Reference Signal
RSCP Received Signal Code Power
RSRP Reference Signal Received Power
RSRQ Reference Signal Received Quality
RS SI Received Signal Strength Indicator
RSTD Reference Signal Time Difference
RV Redundancy Version
RX Receiver
RWR Release with Redirect
SCC Secondary Component Carrier
SCH Synchronization Channel
SCell Secondary Cell
SCG Secondary Cell Group
SCS Subcarrier Spacing
SDU Service Data Unit
SeNB Secondary eNodeB
SFN System Frame Number
SGW Serving Gateway
SI System Information
SIB System Information Block
SIB1 System Information Block Type 1
SINR Signal to Interference and Noise Ratio
SNR Signal to Noise Ratio
S-NSSAI Single Network Slice Selection Assistance Information
SON Self Organizing Network
SS Synchronization Signal
SSC Secondary Serving Cell
SSS Secondary Synchronization Signal
TBS Transport Block Size
TDD Time Division Duplex
TDOA Time Difference of Arrival
TOA Time of Arrival

44

TSS Tertiary Synchronization Signal
TTI Transmission Time Interval
TX Transmitter
UARFCN UTMS Absolute Radio Frequency Channel Number
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

CONCLUSION

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

REFERENCES

1. TR 38.811, Study on New Radio (NR) to support non-terrestrial networks
2. RP-181370, Study on solutions evaluation for NR to support non-terrestrial Network
3. TR 38.821, Solutions for NR to support non-terrestrial networks

The invention claimed is:

1. A method by a wireless device comprising:
prior to a current link failing, obtaining assistance information for identifying at least one cell for performing a cell reestablishment procedure, the assistance information comprising ephemeris data;
detecting a radio link failure associated with the current link; and
after detecting the radio link failure, taking at least one action based on the assistance information, wherein the at least one action comprises:
performing a cell search to identify a particular one of the at least one cell for performing the cell reestablishment procedure based in part on the ephemeris data associated with the particular one of the least one cell; and
performing the cell reestablishment procedure for the particular one of the at least one cell.

2. The method of claim 1, wherein the ephemeris data is obtained from a network node.

3. The method of claim 1, wherein obtaining the assistance information comprises receiving the assistance information from a network node.

4. The method of claim 1, wherein the assistance information indicates the at least one cell.

5. The method of claim 1, wherein the assistance information comprises at least one of: a carrier frequency, a PCI, ephemeris data of a satellite serving the at least one cell, and a timing of SSB transmissions.

6. The method of claim 1, wherein the assistance information indicates that no cell is available, and the method further comprises transitioning to an inactive or idle state.

7. The method of claim 1, wherein performing the at least one action comprises scaling an amount of time associated with a timer that measures a time associated with a cell search procedure.

8. The method of claim 7, wherein scaling the amount of time associated with the timer comprises reducing the amount of time associated with the timer.

9. The method of claim 1, wherein performing the at least one action comprises increasing an amount of time associated with a timer that measures a time associated with a cell search procedure.

10. The method of claim 1, further comprising obtaining information indicating a coverage extension level of the wireless device, and wherein the at least one action is taken based on the information indicating the coverage extension level.

11. The method of claim 10, wherein the coverage extension level indicates that the wireless device has a coverage level that is less than a threshold, and wherein taking the at least one action comprises increasing an amount of time associated with a timer associated with performing a cell search.

12. The method of claim 10, wherein the coverage extension level indicates that the wireless device has a coverage level that is greater than a threshold, and wherein taking the at least one action comprises decreasing an amount of time associated with a timer associated with performing a cell search.

13. The method of claim 1, further comprising obtaining information indicating a location of the wireless device, and wherein the at least one action is taken based on the information indicating the location.

14. The method of claim 13, wherein taking the at least one action comprises increasing an amount of time associated with a timer associated with performing a cell search based on the location of the wireless device.

15. The method of claim 13, wherein taking the at least one action comprises decreasing an amount of time associated with a timer associated with performing a cell search based on the location of the wireless device.

16. The method of claim 1, further comprising obtaining information indicating a signal measurement associated with the wireless device, and wherein the at least one action is taken based on the information indicating the signal measurement.

17. The method of claim 16, wherein taking the at least one action comprises increasing an amount of time associated with a timer associated with performing a cell search based on the signal measurement.

18. The method of claim 16, wherein taking the at least one action comprises decreasing an amount of time associated with a timer associated with performing a cell search based on the signal measurement.

* * * * *